United States Patent
Kurtz et al.

(10) Patent No.: US 8,444,275 B2
(45) Date of Patent: May 21, 2013

(54) LIGHT SOURCE CONTROL FOR PROJECTOR WITH MULTIPLE PULSE-WIDTH MODULATED LIGHT SOURCES

(75) Inventors: Andrew F. Kurtz, Macedon, NY (US); Richard P. Corey, Rush, NY (US); Allen D. Bellinger, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 316 days.

(21) Appl. No.: 12/854,919

(22) Filed: Aug. 12, 2010

(65) Prior Publication Data

US 2012/0038892 A1   Feb. 16, 2012

(51) Int. Cl.
*G03B 21/20*   (2006.01)

(52) U.S. Cl.
USPC .............................. 353/85; 353/94

(58) Field of Classification Search
USPC ................. 353/85, 94, 121, 122; 362/295
See application file for complete search history.

(56) References Cited

U.S. PATENT DOCUMENTS

| | | | |
|---|---|---|---|
| 5,081,631 A | 1/1992 | Dhurjaty | |
| 5,270,736 A | 12/1993 | Inoue et al. | |
| 5,764,664 A | 6/1998 | Yip et al. | |
| 6,008,929 A | 12/1999 | Akimoto et al. | |
| 6,215,547 B1 | 4/2001 | Ramanujan et al. | |
| 6,621,615 B2 | 9/2003 | Kruschwitz et al. | |
| 6,860,606 B2 * | 3/2005 | Childers et al. | 353/31 |
| 6,991,336 B2 * | 1/2006 | Matsui | 353/94 |
| 7,080,909 B2 * | 7/2006 | Matsui | 353/94 |
| 7,147,331 B2 * | 12/2006 | Yamazaki et al. | 353/31 |
| 7,183,723 B2 * | 2/2007 | Yu et al. | 315/247 |
| 7,303,288 B2 * | 12/2007 | Miyazawa et al. | 353/94 |
| 7,303,291 B2 * | 12/2007 | Ikeda et al. | 353/102 |
| 7,357,513 B2 * | 4/2008 | Watson et al. | 353/31 |
| 7,494,227 B2 * | 2/2009 | Yamazaki et al. | 353/85 |
| 7,766,490 B2 * | 8/2010 | Harbers et al. | 353/94 |
| 7,914,150 B2 * | 3/2011 | Yamazaki et al. | 353/31 |
| 7,959,303 B2 * | 6/2011 | Nishioka et al. | 353/85 |
| 8,061,854 B2 * | 11/2011 | Shirai et al. | 353/85 |
| 8,142,021 B2 * | 3/2012 | Silverstein et al. | 353/7 |
| 8,152,311 B2 * | 4/2012 | Cho | 353/85 |

(Continued)

FOREIGN PATENT DOCUMENTS

| | | |
|---|---|---|
| JP | 2005 156711 | 6/2005 |
| JP | 2009 237483 | 10/2009 |

OTHER PUBLICATIONS

Doherty et al., "Phased Reset Timing for Improved Digital Micromirror Device (DMD) Brightness," SID Symposium Digest of Technical Papers, vol. 29, pp. 125-128 (1998).

*Primary Examiner* — Francis M Legasse, Jr.
*Assistant Examiner* — Bao-Luan Le
(74) *Attorney, Agent, or Firm* — Kevin E. Spaulding

(57) ABSTRACT

A color projection display in which at least one color channel includes: a light source assembly including a multiplicity of pulse modulated light sources providing an aggregate light beam; a light modulation control subsystem; illumination optics to direct the aggregate light beam to an image modulation plane; and a spatial light modulator in the image modulation plane. The light modulation control subsystem senses an aggregate light intensity signal for the aggregate light beam and controls the pulse modulation parameters for the multiplicity of pulse-modulated light sources responsive to the sensed aggregate light intensity signal to reduce light intensity fluctuations in the aggregate light beam within the imaging time interval.

25 Claims, 16 Drawing Sheets

U.S. PATENT DOCUMENTS

| | | | |
|---|---|---|---|
| 2004/0125344 A1* | 7/2004 | Matsui | 353/94 |
| 2004/0141158 A1* | 7/2004 | Childers et al. | 353/85 |
| 2005/0122060 A1* | 6/2005 | Yu et al. | 315/247 |
| 2005/0122487 A1 | 6/2005 | Koyama et al. | |
| 2006/0077193 A1* | 4/2006 | Thielemans et al. | 345/204 |
| 2006/0170883 A1* | 8/2006 | Matsui | 353/85 |
| 2006/0279709 A1* | 12/2006 | Yamamoto | 353/85 |
| 2006/0279710 A1* | 12/2006 | Tani | 353/85 |
| 2008/0088914 A1* | 4/2008 | Toyooka | 359/315 |
| 2008/0165815 A1* | 7/2008 | Kamijima | 372/34 |
| 2008/0185978 A1 | 8/2008 | Jeong et al. | |
| 2008/0273123 A1* | 11/2008 | Morikawa et al. | 348/757 |
| 2009/0303443 A1* | 12/2009 | Wachter | 353/20 |
| 2011/0002019 A1* | 1/2011 | Routley et al. | 359/9 |

* cited by examiner

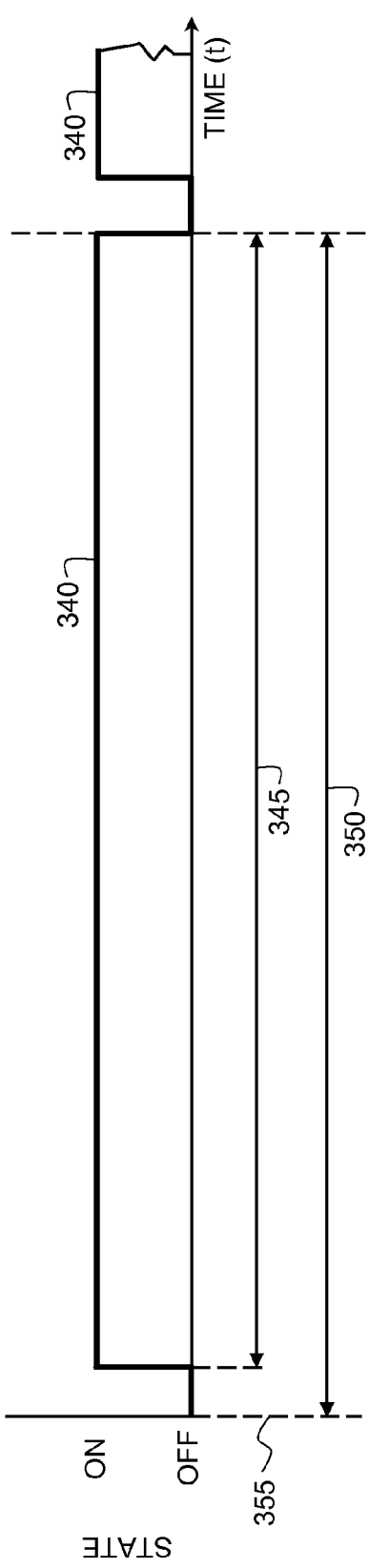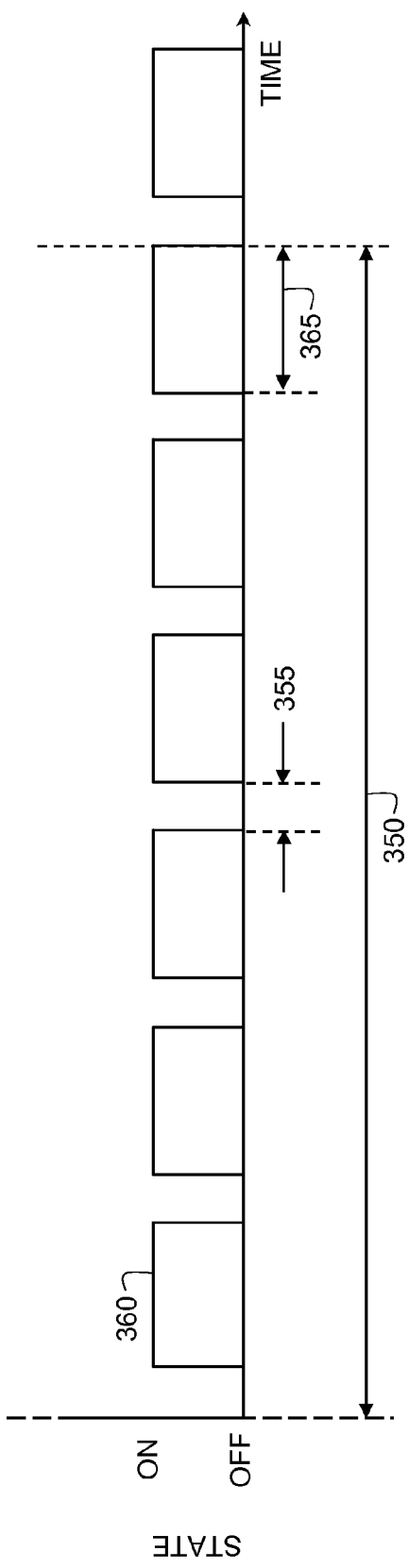
FIG. 8A
FIG. 8B

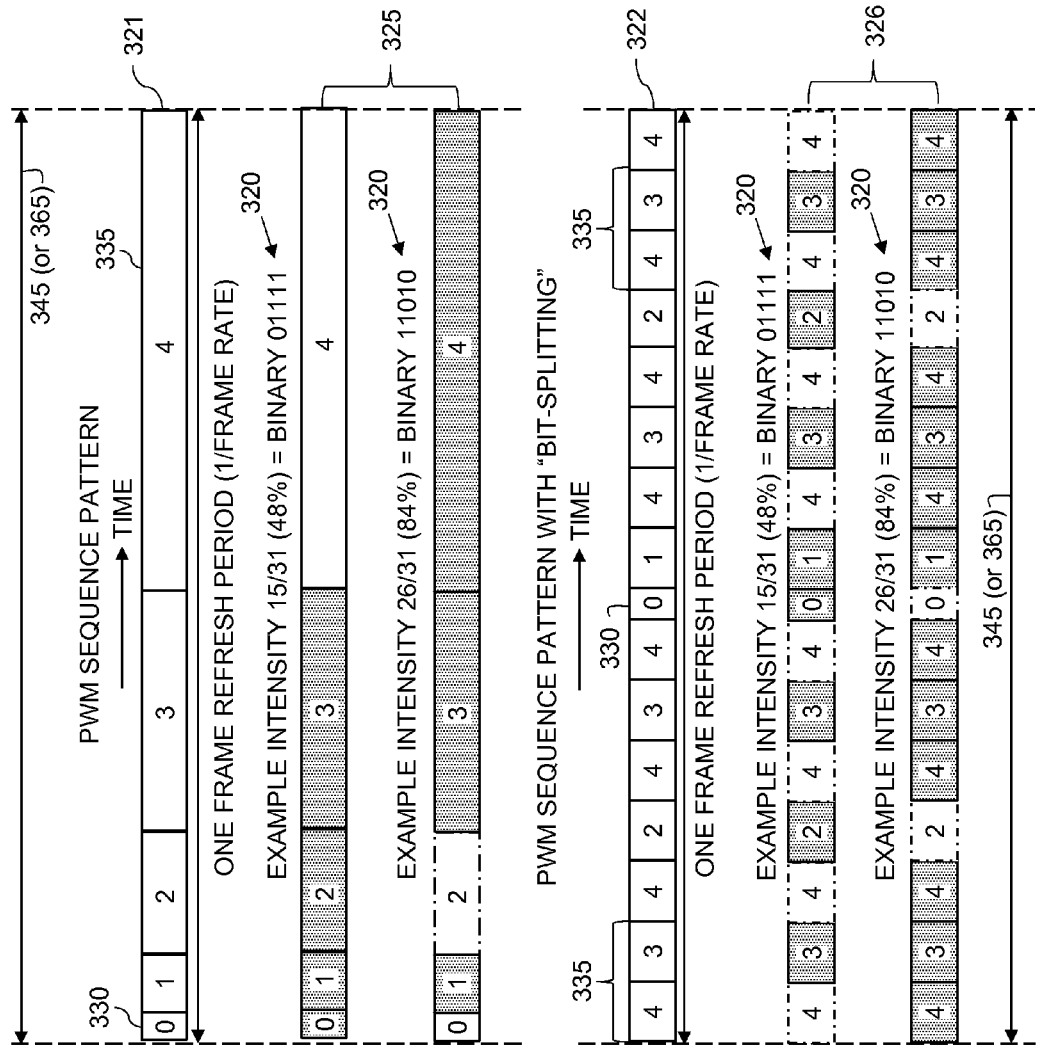

LIGHT SOURCE CONTROL FOR PROJECTOR WITH MULTIPLE PULSE-WIDTH MODULATED LIGHT SOURCES

Reference is made to commonly-assigned U.S. Pat. No. 7,926,951 issued Apr. 19, 2011, entitled "Laser illuminated micromirror projector," by Silverstein et al.; and commonly-assigned U.S. Pat. No. 8,162,483 issued Apr. 24, 2012, entitled "Color intensity feedback loop for stereoscopic projection using solid state light sources," by Silverstein et al., the disclosures of which are incorporated herein by reference.

FIELD OF THE INVENTION

The present invention relates to optical projection systems, and particularly to the modulation, control, and temporal superposition of modulated light from multiple light sources onto an image-data rendering spatial light modulator array.

BACKGROUND OF THE INVENTION

Projection and electronic display systems are widely used to display image content. In the case of projection systems, whether the traditional film based systems, or the newer electronic systems, light from a single light source (typically a lamp) is directed to an image modulation element (such as film or one or more spatial light modulators) that imparts image data to the transiting light. Typically, the film or light modulator arrays are then imaged to the display surface or screen.

For a variety of reasons, including light efficiency, expanded color gamut, increasing lifetime and reducing ongoing replacement costs, there has been continuing pressure to replace the traditional lamps (such xenon arc, tungsten halogen, fluorescent, or UHP) with solid state light sources (such as lasers or LEDs). However, to date, the great desire for laser based projection systems has been unfulfilled as compact, robust, low to modest cost, high power, visible wavelength laser technologies have not emerged in a commercializable form, particularly for green and blue. Very recently, this obstacle has started to disappear, as companies such as Laser Light Engines (Salem, N.H.) and NECSEL (Milpitas, Calif.) have demonstrated prototype or early product laser devices. For example, NECSEL offers green (535 nm) and blue (465 nm) Novalux laser arrays, each of which provides 3-5 Watts of optical output power. At these power levels, and allowing for system efficiency losses, a modest sized projector (1500 lumens output) for a large conference room or a home theatre, can be achieved using a single compact laser device per color. However, in the case of motion picture theaters, the on-screen luminance requires 10,000-40,000 lumens or 40-170 Watts of combined optical power, depending on screen size and screen gain. Presently, these power levels can only be accomplished by optically combining the output of multiple laser arrays in each color channel, although eventually compact laser technologies may advance to the point that 40-120 Watts of optical power is available from a single laser device in each color. Potentially each approach has its advantages and disadvantages, relative to trade-offs of simplicity, cost, and susceptibility to laser failure. At present, however, approaches using single laser devices per color are not commercially feasible.

In comparison to lamp sources, which are typically operated CW (continuous wave output), laser sources are more complex structurally and operationally. Laser sources often benefit relative to lifetime and efficiency, by being pulsed or temporally modulated. In some cases this can be advantageous for system efficiency, as laser light need not be produced and wasted during the dark times that typically occur between image frames or sub-frames. However, in many cases, the available lasers can be reliably operated within only a limited range of PWM parameters, relative to frequency and duty cycle. This is important, as a variety of issues can emerge when pulsed laser light (from one pulsed laser, or a multiplicity of laser sources) illuminates light modulating light valves (such as liquid-crystal-on-silicon (LCOS) devices or digital micro-mirror array devices (DMD) devices). As a first example, image artifacts can occur from the interaction of the laser pulse modulation from the pulsed lasers sources with the temporal modulation of the spatial light modulator (SLM) array pixels, such that image code values or grey scale levels may not be faithfully reproduced if the individual or aggregate laser pulsing provides insufficient light during the projection of image content for each given frame. Secondly, the individual or aggregate pulse characteristics of the laser sources can also change due to operational fluctuations or degradation, which then makes the laser to SLM temporal or pulse interactions unstable. Ultimately, such laser source problems can affect the display color balance or white point, and can also affect the color rendition accuracy. Therefore, it would be valuable to provide a laser projection display in which the laser pulse modulation can be adaptively modified in response to changes in the performance of individual lasers, while maintaining the aggregate pulsed laser performance and a low impact relative to image artifacts.

Pulsing of lasers and other light sources for image display is known in the imaging arts. For example, laser sources can be directly modulated in raster scanning image projection systems or line scanning printing systems to impart image data into the scanning light beam. Numerous direct laser modulation circuits have been developed employing a variable combination of pulse width modulation (PWM) and pulse amplitude modulation (PAM). For example, U.S. Pat. No. 5,270,736, to Inoue et al., entitled "Light modulation method," describes a series of modulation methods for use in laser printers in which light pulses are provided trapezoidal pulse shapes (in time), such that pulses are ramped from below threshold to a peak current, are perhaps held at that level for some time, and then are ramped down again below laser threshold.

As other examples, commonly assigned U.S. Pat. No. 5,081,631 to Dhurjaty, entitled "Direct modulation of laser diodes for radiographic printers," and commonly assigned U.S. Pat. No. 5,764,664, to Yip et al., entitled "Direct modulation method for laser diode in a laser film printer," also describe approaches for direct laser modulation applicable to laser printing. Generally, these laser modulation circuits can also include corrective techniques, to compensate for laser behavior changes by changing the pulse modulation parameters, on at least a line-by-line basis. However, while such art provides foundational material for direct laser modulation, in these systems, individual lasers are writing the image data directly, rather than being used in aggregate as illumination sources to spatial light modulator array devices. As a result, this art does not anticipate the issues that arise when using multiple pulsed laser sources in illumination or in light valves or panels.

It is also recognized that electronic imaging systems have been developed in which one or more pulsed light sources are used to illuminate a modulator array device. As one example, U.S. Pat. No. 6,008,929 to Akimoto et al., entitled "Image displaying apparatus and method," describes a projector in which a modulated light source illuminates a spatial light modulator array (a ferroelectric LCD), that is then imaged to the screen. In this system, the modulator array is fast, but provides binary (only "on" or "off" states) rather than grey scale operation. To compensate, a pulsed light sources is used, which is faster yet relative to rise or fall times, and which can be-periodically modulated with a variable duty cycle. Thus the pulsed light source provides the short, intermediate, and long light pulses that can be used to provide the required bit depth (i.e., tone levels). On a pixel-wise basis, the modulator array determines which pulses are used for the image content associated with a given frame time.

As another example, commonly assigned U.S. Pat. No. 6,621,615 to B. Kruschwitz et al., entitled "Method and system for image display," describes a projection display in which a pulsed laser source is used to illuminate a spatial light modulator array, which image modulates the light that is then projected to the screen. The image modulation signals applied to the pixels of the SLM array are provided as pulse width modulation by a controller. The gray level of a pixel is controlled by switching the pixel into the "on" state for a controlled time, which is a multiple of a least-significant-bit (LSB) time. This system can use pulse number modulation in which the periodically-pulsed laser provides illuminating pulses of light and the pixel-wise modulation of the SLM determines the number of laser pulses that are passed through to the screen. However, Kruschwitz et al. observe that in the case that the laser pulse repetition rate is longer than the LSB time, then LSBs can be lost, and images are not faithfully reproduced. To counter this, the modulation controller of Kruschwitz et al. can apply a variable width switching profile to each pixel, such that the rise times and/or fall times for the LSBs are extended to exceed the pulse repetition rate.

Imaging devices have also been provided in which arrays of light sources are combined to illuminate a modulator array. For example, commonly assigned U.S. Pat. No. 6,215,547 to S. Ramanujan et al., entitled "Reflective liquid crystal modulator based printing system," describes a printer using a reflective liquid crystal modulator and LED array illumination. In this instance, the light source comprises a two-dimensional array of LEDs at three distinct wavelengths representing red, blue, and green emission. The LEDs can be arranged in a mixed color array, with differing numbers of RGB LEDs in the array, the quantity being related to the media sensitivity. Light from the LEDs is collected, homogenized, and directed onto a SLM (a polarization switching LCD). The LEDs are then activated in a color sequential manner. Grayscale printing levels are provided using PWM of an LCD and the LEDs of a color channel in combination. The LEDs of color channel are activated as a group, and the activation cycle consists of a series of pulses, which may vary in duration or amplitude. The length and duration of the pulses are determined by the level of illumination needed per image to define the gray scale and by the sensitivity of media to light level and illumination time.

U.S. Patent Application Publication 2008/0185978, to J. Jeong et al., entitled "Light source driving apparatus, display device having the same, and driving method thereof," describes a laser based projection display in which a plurality of laser devices is used to illuminate a spatial light modulator (a DMD). The multiple laser devices are partitioned into blocks, with one or more lasers devices per block, and they are then driven in a time division or phase offset manner by a switch element. A laser driver provides input to the blocks of laser devices, driving them at a high frequency (200 kHz) and low duty cycle (20%) to provide nominally equivalent output pulse intensities. As a result, the instantaneous current loads on the laser driver are time averaged, and a continuous pulse of light, synthesizing a CW illumination, can be provided to the DMD device for pixel specific PWM based on the image content at a given point in time. Jeong et al. make the assumption that the laser light sources are driven according to optimal frequencies, duty cycles, drive currents, and optical intensities in accordance with the specifications for the laser devices, and that the optical intensities provided by the various lasers devices are equal in output. There are no provisions for optical or electrical monitoring or feedback control of individual laser devices or groups of lasers to correct for changes in laser device behavior. Additionally, Jeong et al. do not consider the interaction of the laser pulses with the PWM of DMD array with respect to providing faithful reproductions of the image content. Jeong et al. also do not consider the interaction of operating multiple color channels simultaneously, each comprising an array of pulsed laser sources, to provide color image content, including the maintenance of color image quality as the performance of laser devices in the various color channels changes with time.

Thus, it is seen that the prior art, whether considered individually or in combination, does not anticipate or teach a method for providing and maintaining image quality, and particularly color image quality, in a laser based projection display that uses a plurality of PWM lasers, operable within a limited parameter range, for illumination in at least one color channel of the laser projector.

SUMMARY OF THE INVENTION

A color projection display, comprising:
a plurality of color channels, in which at least one color channel includes:
   a light source assembly including a multiplicity of pulse modulated light sources providing an aggregate light beam;
   a light modulation control subsystem to control pulse modulation parameters for the multiplicity of pulse-modulated light sources;
   illumination optics to direct the aggregate light beam to an image modulation plane; and
   a spatial light modulator in the image modulation plane having an array of addressable pixel elements, each of which is pulse width modulated during an imaging time interval to impart image data to the transiting aggregate light beam to provide image light;
an optical combiner to redirect image light from the plurality of color channels onto a common optical path; and
projection optics to receive the combined image light traversing the common optical path and to project the combined image light onto a display surface;
wherein the light modulation control subsystem senses an aggregate light intensity signal for the aggregate light beam and controls the pulse modulation parameters for the multiplicity of pulse-modulated light sources responsive to the sensed aggregate light intensity signal to reduce light intensity fluctuations in the aggregate light beam within the imaging time interval.

The present invention has the advantage that interactions between the pulse modulation of the pixel elements of the spatial light modulator and the pulse modulation of the light sources will be reduced, thereby reducing image artifacts such as quantization. It has the additional advantage that it can automatically compensate for performance degradation in one or more of the pulse-modulated light sources.

BRIEF DESCRIPTION OF THE DRAWINGS

FIGS. 8A and 8B depict frame and sub-frame timing diagrams, respectively;

FIGS. 10A and 10B depict bit modulation schemes used with DMD modulator devices;

DETAILED DESCRIPTION OF THE INVENTION

Figure 1:
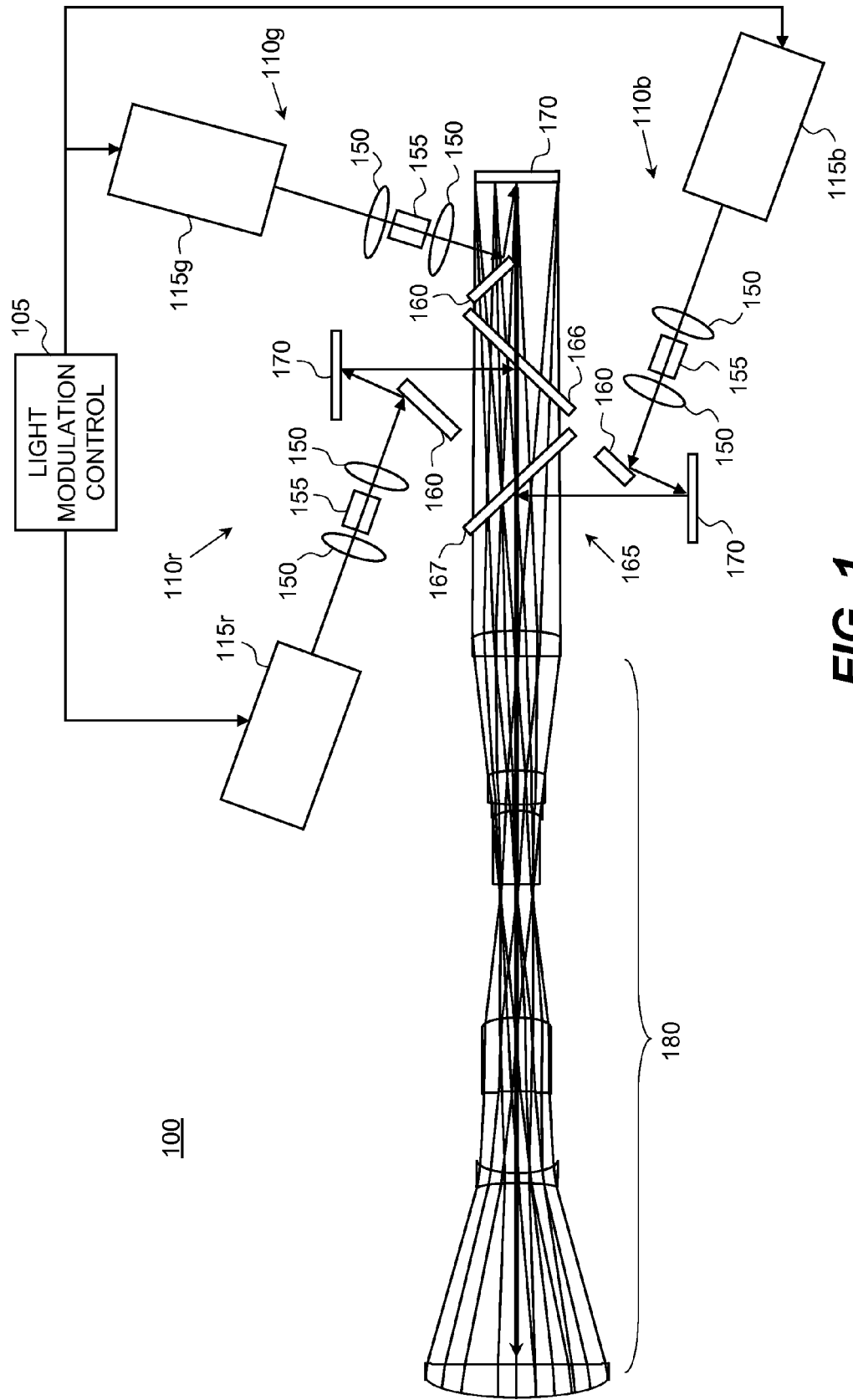
FIG. 1 illustrates the overall system architecture for a projector incorporating the pulsed light source of the present invention.

In order to better understand the present invention, it is instructive to describe the overall context within which apparatus and methods of the present invention can be operable. The schematic diagram of FIG. 1 shows a basic arrangement for projector 100 that is used in a number of embodiments of the present invention. The projector 100 includes an illumination subsystem having three illumination assemblies 110r, 110g, and 110b, each providing one of the primary Red, Green, or Blue (RGB) colors using a corresponding light source assembly 115r, 115g and 115b. Each of the light source assemblies 115r, 115g and 115b comprise a plurality of light sources (not shown), which in a preferred embodiment, are laser light sources. Each light source assembly 115r, 115g and 115b also includes an optical combiner (not shown) to direct light from the multiple light sources to make an effective single light source.

Each illumination assembly 110r, 110g, and 110b typically includes one or more illumination lens 150 and a light integrator 155 (such as a fly's eye integrator or integrating bar, for example) and one or more mirrors 160 to shape and direct the transiting light beams onto an associated spatial light modulator 170. For example, incoming light from the light source assembly 115 can be directed into an integrating bar using an illumination lens 150. The resulting homogenized light fills an output aperture of the integrating bar. The output aperture is then re-imaged by another illumination lens 150 to an area in an optical plane to which the spatial light modulator 170 is aligned. The light path within each illumination assembly 110r, 110g and 110b typically follows the same basic pattern, although there can be differences to accommodate differences in light source (laser) properties from one color channel compared to another. Taken together, an illumination assembly 110r, 110g or 110b and the associated spatial light modulator 170 provide the optical portions of a color channel, whether red, green, or blue. Other associated elements to be discussed subsequently, such as color channel control subsystems within light modulation control subsystem 105, provide electrical portions of the color channel.

The projector 100 also includes an image forming subsystem including a spatial light modulator 170 for each color channel, together with a beam combiner 165 which combines the light beams from each color channel. The spatial light modulators 170, which provides an array of pixel elements for image modulation, can be a micro-electromechanical systems (MEMS) device, such as a DMD or other type of reflective MEMS device, including any of the types of MEMS modulators that modulate light by reflection or by diffraction, such as a grating light valve (GLV) device or a grating electromechanical system (GEMS) device. The spatial light modulators 170 can also be liquid crystal devices, such as LCOS panels, although the present invention is particularly applicable when used with modulators that operate by temporal modulation to provide bit depth or grey levels. The following discussion will assume that the spatial light modulator 170 is a DMD device, such as a Texas Instruments DLP spatial light modulator, although it will be clear to one of ordinary skill in the art that it is equally applicable to any other type of spatial light modulator as well.

Modulator driver electronics (not shown) are used to control the light modulation of each spatial light modulator 170 in a manner consistent with image data received from a data path (not shown) using techniques and equipment known in the art. Typically, the image data is provided by a data processing system (not shown), which performs various image processing operations (such as sharpening and color correction) to adjust the image data according to the characteristics of the projector 100.

Typically, the spatial light modulators 170 are comprised of an array of imaging elements, each of which can be controlled to provide "On" state light (or "image light") that is directed to the display surface, or "Off" state light that is directed into a beam dump (not shown) according to the received image data. Elaborating; if the image data indicates that a particular pixel is to be fully bright (i.e., have a maximum intensity level) the spatial light modulator 170 causes the light associated with the pixel to fully pass along the image path. On the other hand, if the image data indicates that a particular pixel is to be fully off (i.e., have no light intensity), the spatial light modulator 170 causes the light associated with the pixel to fully pass along the light dump path. In the case where the image data indicates that a particular pixel is to have moderate intensity (i.e., not fully on or fully off), the spatial light modulator 170 causes some of the light associated with the pixel to pass along the image path and some to pass along the light dump path. This is typically accomplished by adjusting a duty cycle for bit modulation in order to control the fraction of the time that the light is directed along the image path.

In a preferred embodiment, the projector 100 is a motion picture projector that is used to project digital cinema content. In this case, the image data received from the data path will correspond to a time sequence of image frames for a motion picture. The spatial light modulator 170 is used to sequentially modulate the image path light to form a time sequence of projected image frames. In other embodiments, the projector 100 can be used to project still images. In this case, the spatial light modulator 170 is used to repeatedly project image data for a single image frame.

In some embodiments, 3-D projection can be enabled using an external polarization modulation unit, such as the ZScreen™ provided by Real-D, Beverly Hills, Calif. In such cases, the polarization modulation unit switches the orientations of polarized light sources in an alternating sequence to provide stereo image projection. Audience members then wear polarization sensitive glasses so that light of one polarization orientation reaches the viewer's left eye, and light of an orthogonal polarization orientation reaches the viewer's right eye. This means that "polarization state neutral" spatial light modulators 170 are preferred that do not modulate light at each pixel by modulating the polarization state of the pixel, such that any change to the polarization state of the incident light for any pixel is inadvertent. This means the spatial light modulators 170 will preferably modulate the incident light identically on a pixel-wise basis, regardless of the polarization state of the incident light. It should also be understood that the projector 100 can provide conventional images that are perceived as two dimensional by maintaining a single polarization state or by providing the same image data in both polarization states.

In other embodiments, switchable polarized light can be supplied from the projector 100 itself, such that an external polarization modulator is not required, thereby improving system light efficiency and 3D image quality, while reducing system cost. To accomplish this, the illuminating light from illumination assemblies 110r, 110g and 110b is preferentially polarized. In particular, the light sources are arranged to provide a common polarization state, known as "s"-polarized or "p"-polarized in the language of the field. The illumination assemblies 110r, 110g and 110b can include a variety of optics, including wave plates or polarizers (not shown) to align, preserve, or accentuate the native polarization states of the light sources (e.g., the lasers). The illumination assemblies 110r, 110g and 110b can also include a polarization switching or modulating device (not shown), which can be electro-optically or electro-mechanically actuated, to change the polarization state of the light illuminating spatial light modulators 170 to "s"-polarized, "p"-polarized, or other polarization states (such as left or right circular polarization states) that are useful for 3D image projection. As a result, it is preferred that the various illumination components, including the illumination lenses 150 and the light integrators 155 be polarization preserving.

Image light, bearing image data imparted into the transiting light by the addressed pixels of the spatial light modulators 170 is combined by the beam combiner 165 to traverse a common optical path passing through imaging lens 180 and onto a distant display surface such as a screen (not shown). In the illustrated configuration, the beam combiner 165 includes a first dichroic element 166 and a second dichroic element 167, each having appropriate thin film optical coatings that selectively transmits or reflects light according to its wavelength. For embodiments where the projector 100 is designed to provide 3D image content using internal modulation of the optical polarization states, the beam combiner 165 and the imaging lens 180 should also be polarization neutral, such that little or no differences in efficiency, polarization contrast, or image quality are induced by these elements.

It should be understood that mirrors 160 need not lie in the plane of the optical system. Thus the mirror in the optical path for the green channel is not obstructing light passing to imaging lens 180, as might be otherwise implied by FIG. 1, which is a top down view of one configuration for projector 100. Additionally, while beam combiner 165 is shown as a pair of tilted glass plates, other exemplary constructions can be used, including X-prisms, V-prisms, or Philips (or Plumbicon) type prisms. Mirrors 160 can also be provided in the form of prisms, such as the widely used TIR (total internal reflection) prism that is often used in combination with the Philips prism and DMD devices.

The projector 100 also includes an optical projection subsystem including an imaging lens 180 that images the spatial light modulators 170 onto the display surface at high magnification (typically 50-400×). In the exemplary embodiment shown in FIG. 1, the imaging lens 180 is depicted as a multi-element assembly that images spatial light modulators 170 directly to the display surface.

Figure 2:
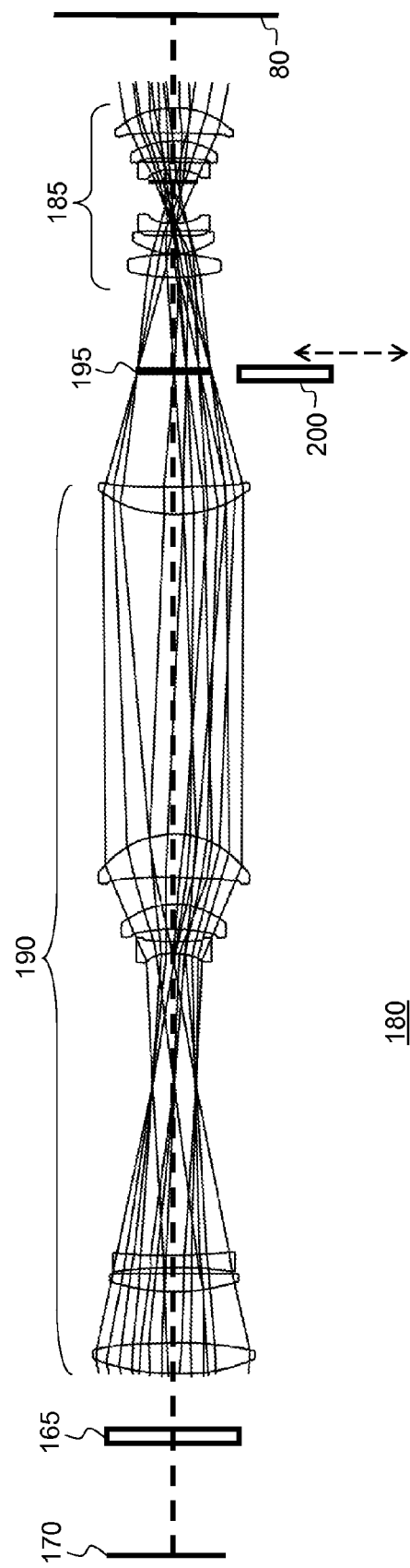
FIG. 2 depicts an alternate embodiment of the imaging lens in FIG. 1.

FIG. 2 shows an alternate embodiment of the imaging lens 180 which includes a relay lens 190 and a projection lens 185. The relay lens 190 images the spatial light modulators 170 to an intermediate image plane at a low magnification (1-2×) to create a real, aerial, color, intermediate image 195. The projection lens 185 images the intermediate image 195 to the display surface (screen 80). The intermediate image plane in the FIG. 2 imaging lens configuration is useful in laser based projection systems for providing a plane to position speckle reduction elements (e.g., despeckler 200). Also, the design of the imaging lens 180 is eased appreciably, as a single lens assembly is not burdened with the working distance constraint of imaging through the beam combiner 165 (shown as a single element for illustrative purposes) while simultaneously imaging to the screen. The separate lens assemblies (i.e., the relay lens 190 and projection lens 185) are comparatively much easier to design and build. Those benefits more than compensate for the extra burden of providing two separate lens assemblies.

The projector 100 also includes a light modulation control subsystem 105 which controls the modulation of the light source assemblies 115r, 115g and 115b. According to a preferred embodiment of the present invention, the light modulation control subsystem 105 controls pulse modulation parameters for the individual light sources in the light source assemblies 115r, 115g and 115b responsive to sensing aggregate light intensity signals for each of the light source assemblies 115r, 115g and 115b.

Figure 3A:
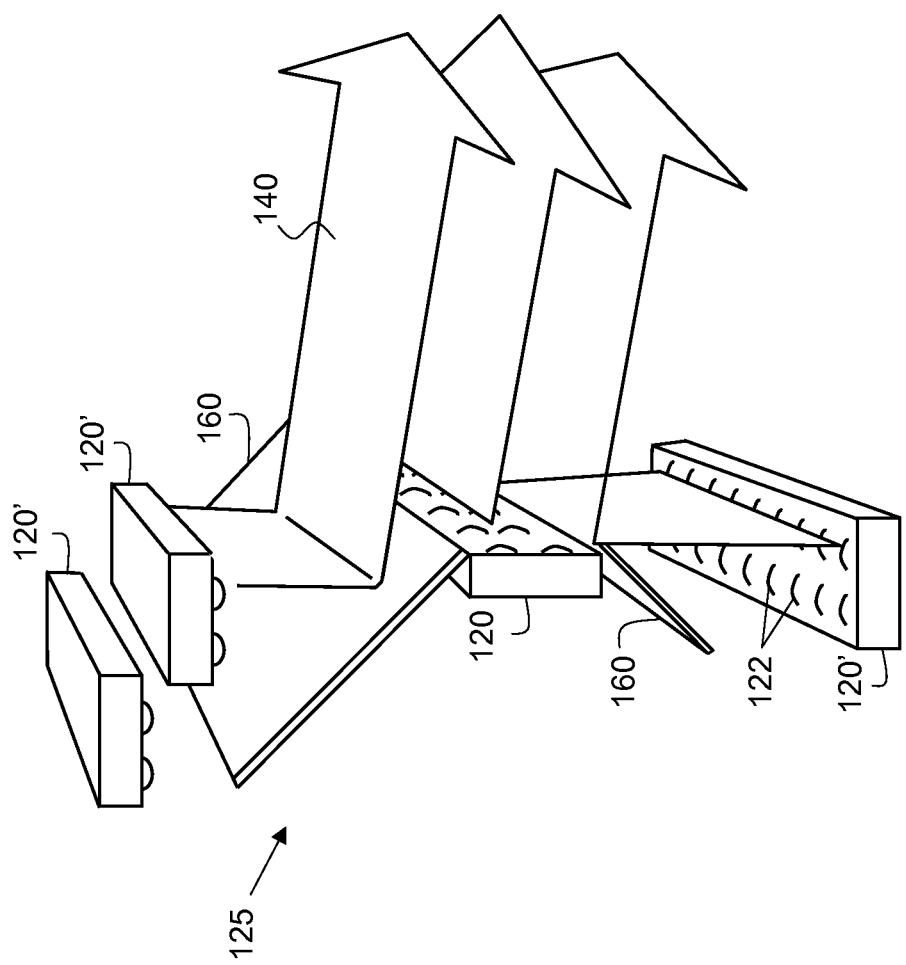
FIGS. 3A-3C illustrate exemplary laser combining assemblies for combining light from multiple pulsed laser devices that can be used in accordance with various embodiments of the present invention.
Figure 3B:
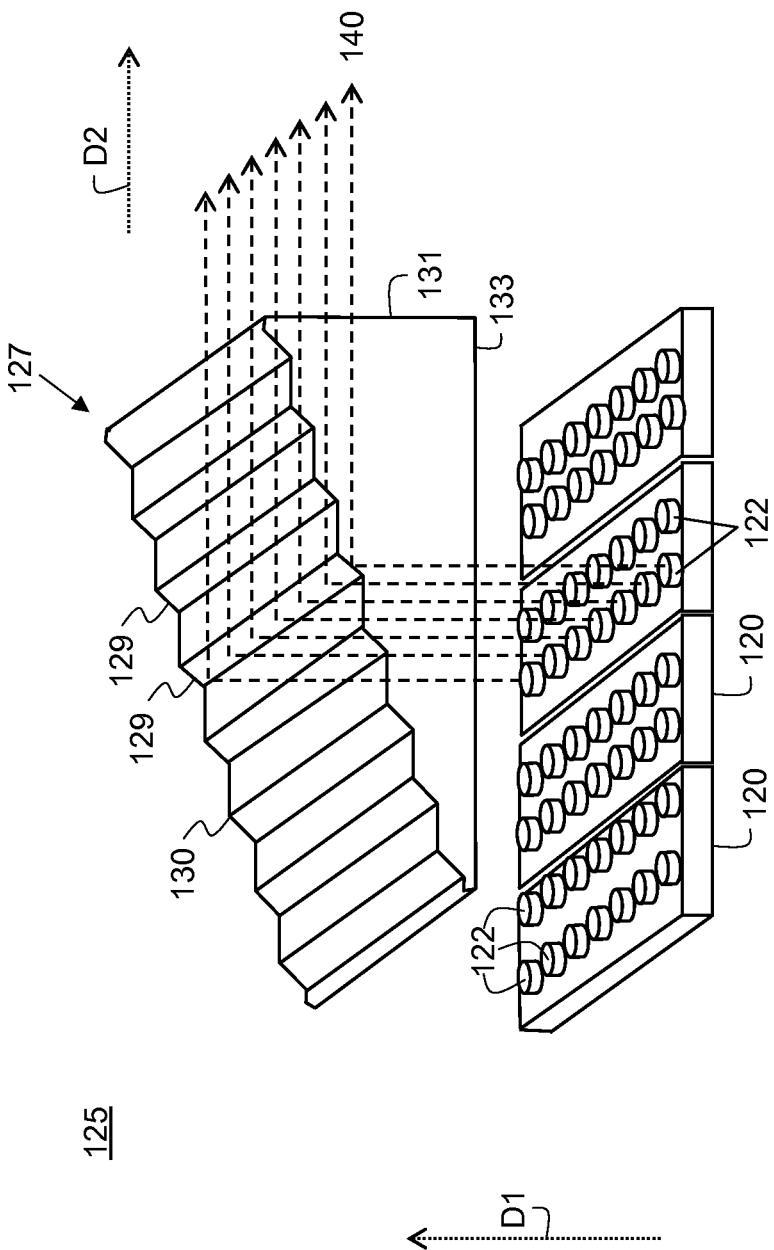
Figure 3C:
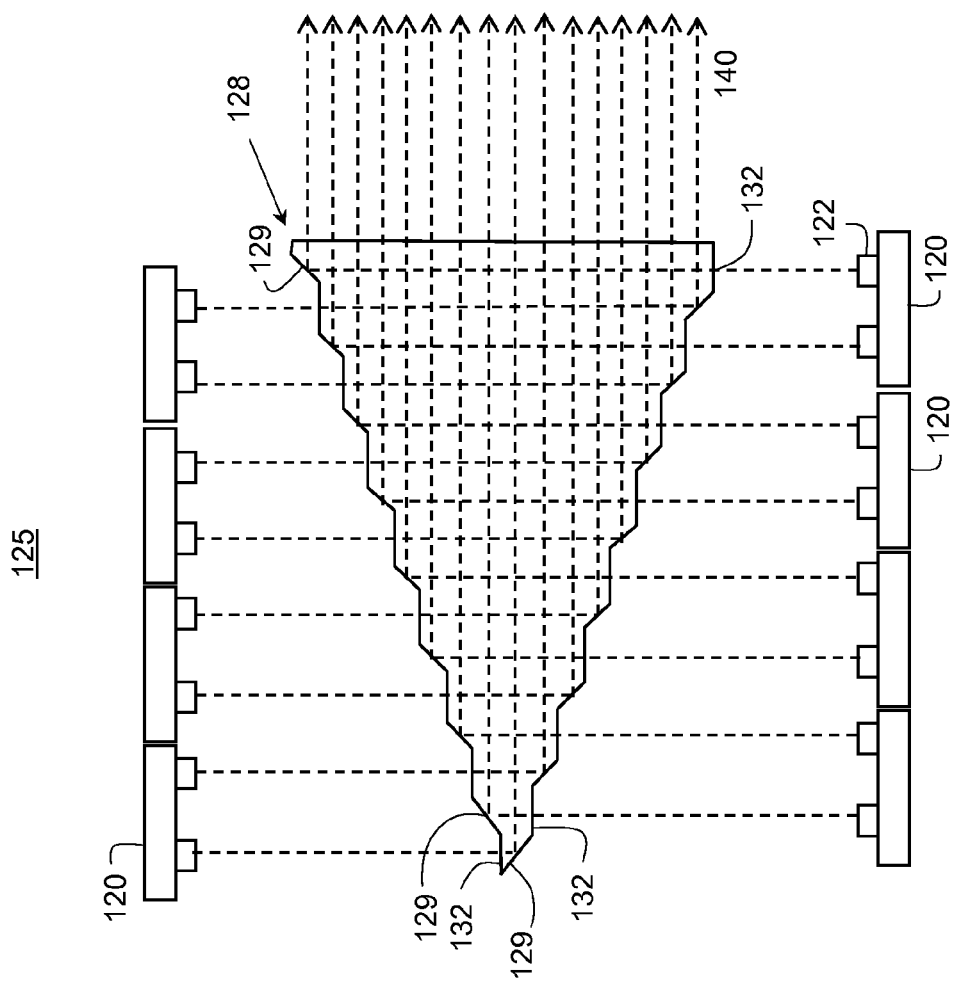

Any method for combining a plurality of laser devices known in the art can be used for the light source assemblies 115r, 115g and 115b. FIGS. 3A-3C illustrate a number of exemplary laser combining assemblies 125 that can be used to combine light from multiple pulsed laser devices according to various embodiments of the illumination subsystem for the present invention. In each case, the laser combining assembly 125 combines light from multiple laser arrays 120 (and 120') and directs the combined light along a common optical axis. Each of the laser arrays 120 include a plurality of laser emitters 122, which can be driven in a pulse-modulated fashion. The use of multiple laser devices in each color channel provides both the required optical output (watts or lumens) as well as redundancy relative to the degradation or failure of individual laser devices.

In some embodiments, the previously mentioned Novalux laser arrays from NECSEL can be used for the laser arrays 120. These laser arrays utilize a type of IR pumped, frequency doubled, VECSEL (Vertical Extended Cavity Surface-Emitting Laser) laser emitter 122. Due largely to heat and packaging problems for critical components, the current pre-commercialized Novalux laser devices have a constrained architecture that provides two parallel rows of laser emitters 122 (24 emitters per row). Conventional VECSEL designs are prone to difficulties with power connection and heat sinking, which is compounded by the 3-6 Watts produced by these devices. There can be significant current requirements and heat load from the unused current. Thus, device lifetime and beam quality is highly dependent upon stable device temperature maintenance. For this reason, laser combining assemblies 125 used for the present invention should generally include cooling subsystems to maintain the temperature of the laser devices at a specified operating temperature.

The coupling of N laser arrays 120 to the projector 100 presents various difficulties that are not encountered by conventional lamp based projectors, or prior art laser projectors. For example, to provide the approximate 10,000-12,000 lumens on-screen required for most theatres, N=9 to 12 laser arrays 120 are needed in the laser combining assembly 125 for each color channel. While it is optically beneficial to closely arrange the output light beams from the constituent laser arrays, it is also desirable to mechanically separate the laser arrays 120 from each other, to reduce thermal crosstalk and loading. It is also desirable to separate the light source assemblies 115r, 115g and 115b, as well as the electronic delivery and connection and the associated heat, from the primary, thermally sensitive, optical projection system, to allow optimal performance of the projection engine.

A variety of opto-mechanical architectures can be used for combining laser beams within the illumination portion of a color channel. In FIG. 3A, one or more interspersed mirrors 160 can be used to place the optical axis of additional laser arrays 120' in line with laser array 120 to provide a multitude of light beams 140 directed together through the remaining optical components in the illumination assembly 110r, 110g and 110b. A housing (not shown) can enclose various components, including the laser devices, beam steering mounts, mirrors, and photodiodes, to create a robust, optically clean, modular illumination sub-assembly.

FIG. 3B shows an alternate embodiment of laser combining assembly 125 in which a faceted prism 127 has an incident surface 133 that accepts light emitted from laser emitters 122 in laser arrays 120 in an emission direction D1. Light is redirected through an output surface 131 to provide light beams 140 in an output direction D2 that is substantially orthogonal to emission direction D1. The faceted prism 127 has a redirection surface 130 with a plurality of light-redirecting facets 129. The light-redirecting facets 129 are at an oblique angle relative to emission direction D1 and provide total internal reflection (TIR) to light emitted from laser emitters 122. When staggered, these features help to narrow the light path for this illumination, providing a narrower combined light beam.

The beam combining approach shown in FIG. 3B can be expanded to use a dual-sided faceted prism 128 as illustrated by the laser combining assembly 125 in FIG. 3C. In this example, a series of light input facets 132 are arranged in alternating fashion between the light redirecting facets 129 on opposite sides of the dual-sided faceted prism 128. This enables laser arrays 120 with laser emitters 122 to be positioned on both sides of the dual-sided faceted prism 128. With this approach, light beams 140 from the two rows of laser emitters on a given laser array 120 are interleaved with light beams 140 from different laser arrays 120, providing an initial spatial mixing of the illumination light.

Figure 3D:
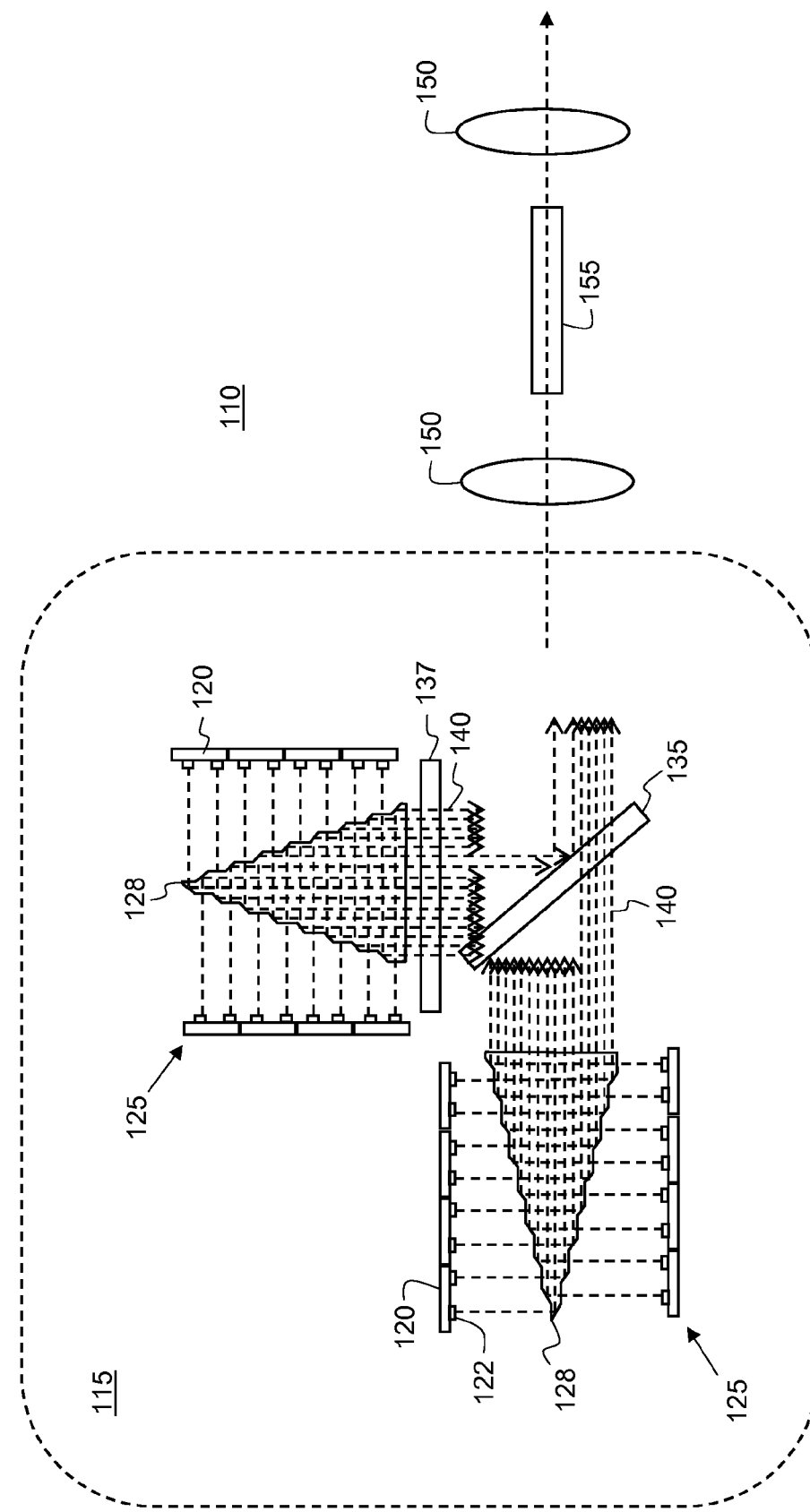
FIG. 3D illustrates an exemplary illumination assembly including a light source assembly having a pair of laser combining assemblies that can be used in accordance with various embodiments of the present invention.

FIG. 3D depicts a portion of an illumination assembly 110, including a light source assembly 115 that includes two laser combining assemblies 125 of the type shown in FIG. 3C, each including a dual-sided faceted prism 128. This configuration combines a total of N=16 laser arrays 120, each having a plurality of laser emitters 122, thereby providing more light to support larger screens with higher screen lumen requirements. The output light beams 140 from the two laser combining assemblies 125 are directed by illumination beam combiner 135 along a common optical path towards the other illumination optics (e.g., illumination lenses 150 and light integrator 155). Illumination beam combiner 135 can combine beams by a variety of approaches, including spectrally, spatially, or by polarization. One path can have an optional half wave plate 137 to rotate the polarization of the light beams 140.

Figure 4:
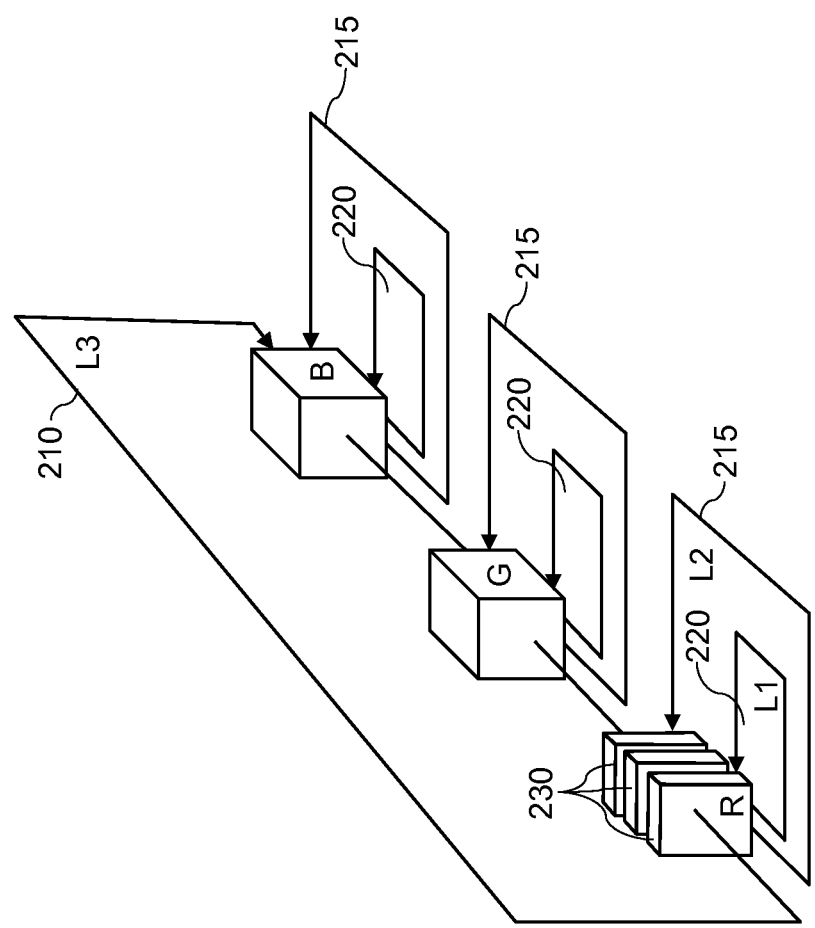
FIG. 4 illustrates a hierarchy of individual light source, color channel, and white point control loop subsystems, according to some embodiments of the present invention.
Figure 5:
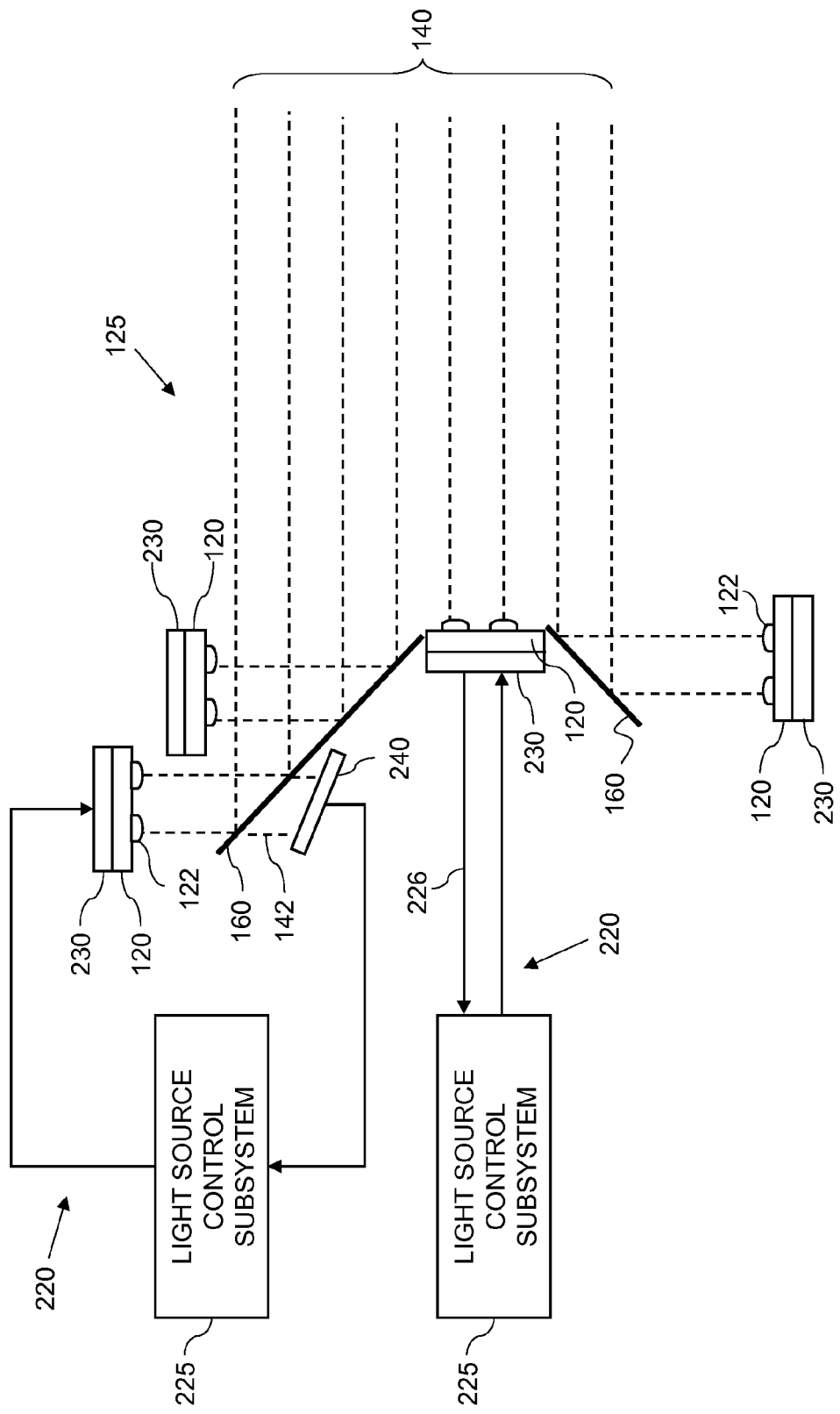
FIG. 5 illustrates an exemplary embodiment of a laser combining assembly including laser arrays controlled by light source control subsystems.
Figure 6:
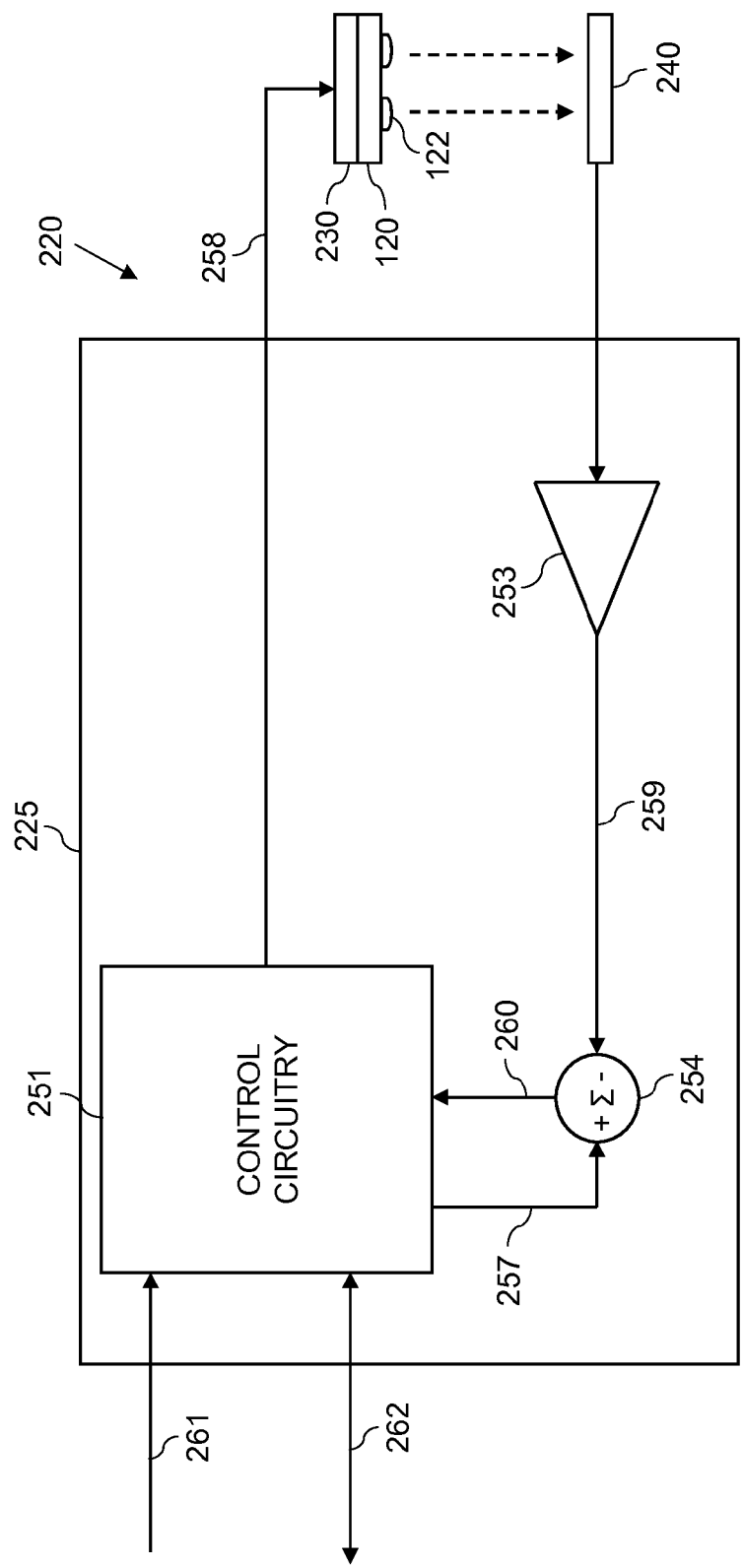
FIG. 6 illustrates an exemplary embodiment of a light intensity source subsystem.

The design and function of an exemplary light modulation control subsystem 105 (FIG. 1) is illustrated in FIGS. 4-6. FIG. 4 shows an exemplary hierarchy or nested set of control loops (L1 loop 220, L2 loop 215 and L3 loop 210) providing three levels of intensity control: the L1 loops 220 control individual light sources, the L2 loops 215 control single color channels, and the L3 loop 210 controls the system white point by controlling the relative response of the various color channels. In a particular embodiment, only a subset of the control loops may be used. For example, some embodiments may use only one control loop (e.g., the L2 control loop). Other embodiments may use two control loops (e.g., the L2 and L3 control loops).

In more detail, a series of L1 loops 220 can be provided, one per light source in each color channel, to monitor the performance of the individual laser arrays 120. L1 loops 220 provide feedback control of the emitted light from an individual light source to alter or maintain the performance relative to a constant light intensity output or L1 set point. In a preferred embodiment, the individual light source is a laser array 120 (FIG. 1) comprising a plurality of pulse-modulated laser emitters 122 (FIG. 1). In this case, the finest level of feedback control controls the emitted light for all of the laser emitters 122 in a particular laser array 120 as a unit. Alternately, the individual light source can be a single laser emitter 122 in order to provide feedback control on an individual laser basis. In other embodiments, the individual light source can be other types of light sources such as pulse-modulated LED light sources.

In a particular L1 loop 220, the light level of the emitted light from the individual light sources is sensed, and the sensed light level is used to control the individual light source in order to produce an aim response (L1 set point). In this way, it is possible to stabilize the output intensity and compensate for aging effects. In a preferred embodiment, the individual light source is a pulse-modulated laser device having an associated laser driver 230. The individual light source is controlled by adjusting one or more pulse modulation parameters in the laser driver 230 such as pulse duty cycle parameter or a pulse amplitude parameter. For example, if it is detected that the light intensity of the individual light source is declining as the light source ages, the pulse duty cycle can be increased or the pulse amplitude can be increased to compensate.

L2 loops 215 are used to provide feedback control of the emitted light on a color-channel basis. In this case, the aggregate color channel light intensity from a complete light source assembly 115r, 115g or 115b (FIG. 1) is sensed and used to provide feedback control for the individual light sources in the light source assembly. The L2 loop 215 can be used to control the overall light intensity produced by the light source assembly by sensing an average aggregate color channel light intensity and adjusting the pulse modulation parameters to maintain the aggregate light intensity at a predefined aggregate set point (L2 set point). For example, if the L2 loop 215 determines that the average aggregate color channel light intensity has drifted away from the L2 set point, the light intensity of the individual light sources can be increased accordingly (for example by providing instructions to the L1 loops 220 to change their respective set points.) Also, as some number (m) of the N light sources can degrade or fail, the L2 loop 215 can adjust the L1 set points for the remaining N-m light sources to increase their light intensities, so that the average aggregate color channel intensity can be maintained or controlled, with the remaining N-m light sources potentially being driven harder. The L1 set points can be changed by identical or comparable percentages, or differentially, to provide weaker or more unstable laser arrays 120 an advantageous set point that maintains enhanced performance. Alternately, rather than adjusting the L1 set points, the L2 loop 215 can directly adjust the pulse modulation parameters for the individual light sources.

Additionally, the L2 loops 215 can also be used to monitor and correct for light intensity fluctuations in the aggregate light beam within the frame time. To this end, the time varying characteristics of the aggregate light intensity can be sensed and the pulse modulation parameters of the individual light sources can be adjusted accordingly. To accomplish this purpose, it will be useful to adjust various pulse modulation parameters for the individual light sources that control the way that the pulses overlap with each other. Examples of such pulse modulation parameters would include pulse phase delay parameters and pulse frequency parameters, as well as pulse duty cycle parameters and pulse amplitude parameters.

For stereo imaging applications, the L2 loop 215 can also be used to control or equalize the aggregate light intensity relative to differences between the left-eye and right-eye light paths. Differences between the light intensities in the two polarization states can occur if the internal polarization switching subsystem introduces optical efficiency differences for left-eye polarized light versus right-eye polarized light.

An L3 loop 210 is used to provide feedback control over the entire set of light source assembly 115r, 115g and 115b. The L3 loop 210 senses the relative light intensities of the individual color channels and adjusts them accordingly in order to achieve a target system white point (L3 set point). If for example, a given color channel is weakening (e.g., producing a lower aggregate light intensity) with respect to the others, the L3 loop 210 can provide instructions to the L2 loops 215 for the other two channels, such that their aggregate intensity levels can be adjusted to hold to a target white point or white point range. A white point is a set of tristimulus values or chromaticity coordinates that serve to define the "white" color produced by the projector 100. White balance then means that maximum intensity of the red, green, and blue light are adjusted so that they combine to produce a specified white point. Similarly, color balance is typically taken to mean that intermediate grey levels are neutral, without color tinting, throughout the neutral tone scale. For RGB projection systems, the white point will generally occur when one of the red, green and blue color channels are driven at the maximum output levels. The output level of the remaining color channels are reduced to achieve the specified white point In some embodiments, all of the control loops (L1, L2 and L3) are executed automatically on a continuous basis. In other cases, some of the control loops may be executed automatically and continuously, while others may never be performed, or may be performed on an as-needed basis. For example, the L1 loop 220 and the L2 loop 215 can be executed automatically and continuously, while the L3 loop 210 can be performed manually on an as-needed basis, or according to a regular maintenance cycle (e.g., once-per-day or once-per-week).

Even if a particular control loop (e.g., the L3 loop 210) does not provide automatic and continuous correction, the system can be configured to sense the light intensities and provide a warning to the system operator when the performance falls outside of a specified range. Such systems are sometimes referred to herein as "measuring" systems or "monitoring" systems instead of "control" systems. For example, the relative intensities of the color channels can be monitored and if the sensed white point deviates significantly from the target system white point, a message can be displayed to the operator instructing him to perform a manual white point correction operation at the next convenient opportunity.

To expand further, FIG. 5 depicts exemplary L1 loops 220 in the context of an exemplary laser combining assembly 125 that produces light beams 140. Light source control subsystems 225 control the light produced from corresponding laser arrays 120 by adjusting various pulse modulation parameters supplied to associated laser drivers 230. (For illustration purposes, L1 loops 220 are shown for two of the laser arrays 120 in FIG. 5, using internal and external sensing, respectively. However, it should be understood that L1 loops would generally be provided for each of the laser arrays 120.)

In some embodiments, the light source control subsystems 225 adjust pulse amplitude parameters that increase or decrease the amplitude of the voltage or current supplied to the laser arrays 120, thereby increasing or decreasing the intensity of the light pulses produced by the laser arrays. In alternate embodiments, the light source control subsystems 225 can adjust other pulse modulation parameters such as pulse duty cycle parameters that can be used to increase or decrease the time duration of the light pulses produced by the laser array, thereby increasing or decreasing the time-averaged light intensity produced by the laser arrays 120.

In this example, the laser drivers 230 have associated circuitry (not shown) that controls the laser emitters 122 of a laser array 120 on a group or ensemble basis. That is, the laser drivers 230 do not address, modulate, or control each laser emitter 122 on an individual basis, but control the output of the laser emitters 122 of a laser array 120 as a group. However, in alternate embodiments, the light source control subsystems 225 can provide control for individual laser emitters 122 if the laser array devices are configured to allow individual emitter addressing.

Monitoring of output light intensity from each laser array 120 can occur in various ways. For example, the output light intensity of an individual laser array can be monitored using a light intensity sensor, such as a photodiode 240, positioned to receive and measure leakage light 142 originating from the laser array. For example, the photodiode 240 can be placed behind a mirror 160 that leaks a small amount (e.g., 0.2 to 0.5%) of the incident light. Such leakage light 142 can originate from an individual laser emitter 122 or a group of laser emitters for a given laser array 120, with or without the benefit of a diffuser or light integration cavity to spatially average this light prior to the photodiode. In other embodiments, the laser array 120 can provide a light intensity signal 226 using internal feedback monitoring (see FIG. 5). The internal feedback monitoring may employ an internal light sensing component, or may infer the light intensity by evaluating electrical signal levels.

FIG. 6 illustrates additional details of an exemplary implementation of a light source control subsystem 225 that is part of an Li loop 220 used to control a laser array 120. The laser driver 230 drives the laser array 120 as a function of a control signal 258. The laser driver 230 generally includes a laser current source (not shown) which supplies current to laser diodes (laser emitters 122) in the laser array 120. In various embodiments, the laser current source can be a voltage controlled current source, a voltage controlled voltage source with direct analog current feedback and internal analog control loop, or a voltage controlled voltage source with digital control provided by an internal digital control loop and indirect current feedback. The laser current source can include a digital-to-analog converter with appropriate amplifiers and circuitry to produce the current output, in which approach the control voltage (in control signal 258) will exist as a mathematical construct delivered to the current source via one or more binary signals. The laser current source can alternatively comprise analog and digital circuitry to produce a current output in direct response to an analog voltage of the control signal 258.

The photo diode 240 samples the light emitted by the laser array 120 to determine the intensity of this light. The current through the photo diode 240 provides input to a transimpedance (current-to-voltage) amplifier 253. The output of the amplifier 253 is a voltage signal 259 that is proportional to the power of the light (intensity) sampled by the photo diode 240. A summation device 254 provides an error signal 260 equal to the difference between an aim voltage 257 and the voltage signal 259 from amplifier 253. In this regard, the aim voltage 257 acts as an indication of a predetermined aim laser light intensity. The aim voltage 257, in some embodiments, is derived from instructions received from the L2 loop 215. Control circuitry 251 receives the error signal 260, and if the absolute value of the error signal 260 is greater than a predetermined threshold amount, the control circuitry 251 adjusts the control signal 258 in a manner that brings such difference to within the threshold amount. In some embodiments, the control circuitry 251 is of the type known in the art as Proportional Integral Derivative Controller/Pulse Width Modulation (PID/PWM) computation circuitry.

The summation device 254 can operate on digital representations of the voltage signal 259 and the aim voltage 257, and may be a component of the control circuitry 251 rather than being a discreet physical entity. Depending upon the embodiment being implemented, the control circuitry 251 can receive control data and report status information to other components of the light modulation control subsystem 105 (FIG. 1) via the bus 262. For example, the control circuitry 251 can receive intensity control data via the bus 262 from the L2 loop 215 or the L3 loop 210 providing aim light intensity values for the laser array 120. Also, the control circuitry 251 can report to the L2 loop 215 via the bus 262 if there is a failure to reach a requested (predetermined) laser output. In stereoscopic embodiments, a left/right signal 261 can be provided from the upper levels in the control loop hierarchy and used by the control circuitry 251 to modify the control signal 258 to alter the light intensity produced by the laser array 120 in synchronization with the left and right image data.

Figure 7:
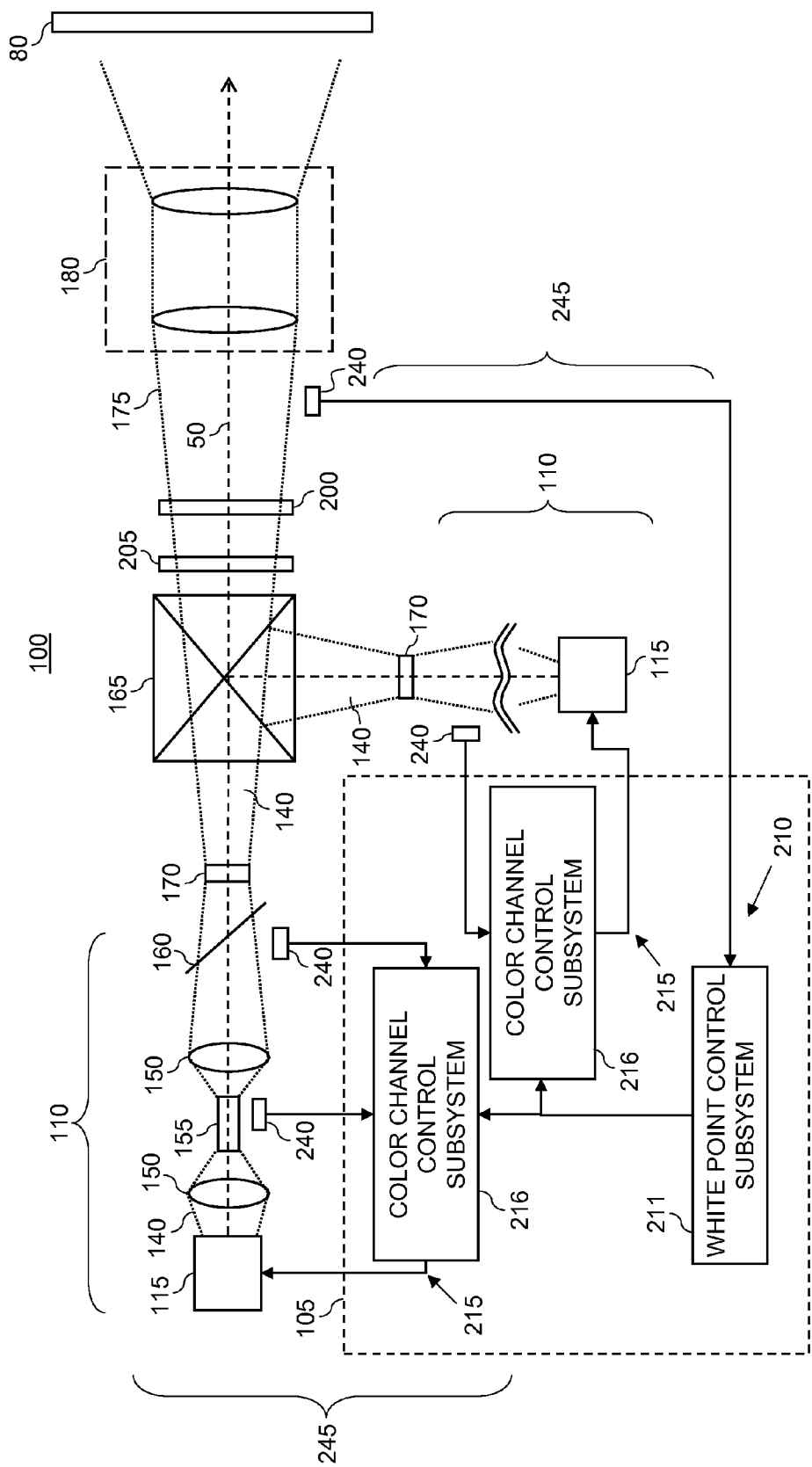
FIG. 7 illustrates a portion of a projector, including color channel control subsystems for two color channels, and a white point control subsystem.

FIG. 7 depicts an exemplary portion of projector 100, having two color channels 245, each including illumination assemblies 110 and spatial light modulators 170. (Note that typical color projectors will generally include three color channels, but only two are illustrated here for illustration purposes.) Each illumination assembly 110 includes a light source assembly 115, together with various optical components (i.e., illumination lenses 150, light integrator 155 and mirror 160) which direct light beam 140 onto the spatial light modulators 170. The projector 100 also includes beam combiner 165 which combines the image light from the two color channels 245 and an imaging lens 180 which directs image light 175 along optical path 50 onto screen 80.

FIG. 7 also depicts the presence of an optional shutter 205 to block light to the screen 80, as well as a despeckler 200. Despeckler 200 can utilize any type of despeckling mechanism known in the art, such as an electro-optic modulator, an optical diffuser, a lenslet array, or some other element, that alters the relative phase or coherence, or increases the angular diversity of the laser light, with the effect of reducing the perceptibility of on-screen speckle by temporal averaging. As was discussed previously with respect to FIG. 2, in some embodiments it is advantageous for the despeckler 200 to reside at or near an intermediate image plane of the imaging lens 180. In other embodiments, despeckling devices can be provided in the illumination light paths prior to spatial light modulators 170, or vibration can be imparted to the surface of screen 80 to reduce speckle perceptibility.

FIG. 7 also includes various components of the light modulation control subsystem 105, namely color channel control subsystems 216 for each color channel 245 which are components of L2 loops 215, and a white point control subsystem 211 which is a component of L3 control loop 210. Photodiodes 240 are shown for sensing light intensities sampled from one of the light beams 140 or the image light 175, as appropriate to provide input to the light modulation control subsystem 105.

Each color channel control subsystem 216 uses input from one or more photodiodes 240 that measure light intensities in aggregate light beams 140. Preferably, the photodiodes 240 are positioned to measure the light intensity at a point in the imaging chain after the aggregate light beams 140 have been mixed and uniformized by the light integrator 155, but before the image data has been imparted to the light beams by the spatial light modulators 170. The color channel control subsystems 216 use the sensed light intensities to control the light sources in the corresponding light source assembly 115 such that the aggregate light beam achieves the specified light intensity characteristics. Generally the specified light intensity characteristics will include a specified average light intensity. In some embodiments, the specified light intensity characteristics can also include specifications on allowable temporal light intensity fluctuations in the aggregate light beam. The temporal light intensity fluctuations can be controlled by adjusting various pulse modulation parameters for the individual light sources (e.g., the laser arrays 120), including pulse duty cycle parameters, pulse phase delay parameters, pulse frequency parameters or pulse amplitude parameters.

The white point control subsystem 211 uses input from one or more photodiodes 240 that measure light intensities in the aggregate light beams 140. Preferably, the photodiodes 240 are positioned at a point in the imaging chain following the beam combiner 165 in order to account for any color-channel-dependent attenuations that may occur within the beam combiner 165. In some embodiments, separate photodiodes 240 are used to sense each of the different color channels 245. In other embodiments, the light intensities in the individual color channels can be determined using a single photodiode 240 by energizing only one color channel at a time or by sequencing through a set of color filters. It will generally be desirable to evaluate the light intensities in the combined light beam with an image frame having a full-on white image signal. As a result, it may be preferable to only perform white point correction operations at a time when the projected image is not being viewed by an audience (e.g., as part of a regular maintenance procedure that is performed during off-hours). The white point control subsystem 211 evaluates the relative light intensities of the different color channels and makes any necessary adjustments to the aim light intensities of the individual color channels in order to achieve a specified white point. In a preferred embodiment, the light intensities determined by the L3 loop 210 are passed on to be used as the aim intensity values for the L2 loops 215 for the respective color channels.

The laser arrays 120 in the light source assemblies 115 generally operate by pulse with modulation by sequentially pulsing the individual laser emitters to obtain a time sequence of laser pulses. The intensity of the light beam is controlled by adjusting the pulse amplitude and duty cycle. The spatial light modulators 170 also typically operate to control the perceived light intensity of a particular image pixel using a pulse width modulation approach. It is important to properly account for the interactions between the pulse width modulation of the laser arrays 120 and the spatial light modulators 170 and in order to involve undesirable artifacts such as quantization due to loss of bit-depth in the projected image.

The base cinematic projection frame rate is typically 24 fps (or 24 Hz), which corresponds to a frame time of 41.67 ms. In a film projector, a shutter effectively doubles the frame rate, to reduce flicker perception. Digital or electronic projectors have similar frame replication effects. Consider the timing diagram of FIG. 8A, in which a frame 340 has a frame time 350 comprising a blanking time 355 and a frame ON time 345. The blanking time 355 is an OFF state, when light is nominally not sent to the screen 80. The frame ON time 345 is the portion of the frame time 350 when the projector 100 provides image light to the screen with the light intensity in spatial and temporal accordance with the image content.

At present, to enable 3-D presentation, DMD projectors utilize "Triple Flash" projection, where six sub-frames 360, having sub-frame ON times 365, are presented per frame time 350, as depicted in FIG. 8B. In the case of 3-D projection, the left-eye and right-eye images are each presented to the eye three times per frame, for an effective frame rate of 144 Hz (which corresponds to a 6.94 ms sub-frame time). In the case of 2-D projection, the identical frame content is presented in each of the six sub-frames. Within each of the sub-frames 360, whether for 2D or 3D, DMD projection uses a temporal or pulse width based modulation scheme on a pixel-wise basis to present the image content according to the corresponding pixel code values. The sub-frames 360 occur with a high duty cycle (~95%), with short blanking times 355 between sub-frames 360. During the blanking times 355, various periodic timing events, such as polarization switching or DMD global reset functions, can occur without causing on-screen image artifacts. The frame ON time 345 or the sub-frame ON times 365 represent the time that a particular set of image data are projected to the screen 80 and can be referred to collectively as the "imaging time interval."

Figure 9:
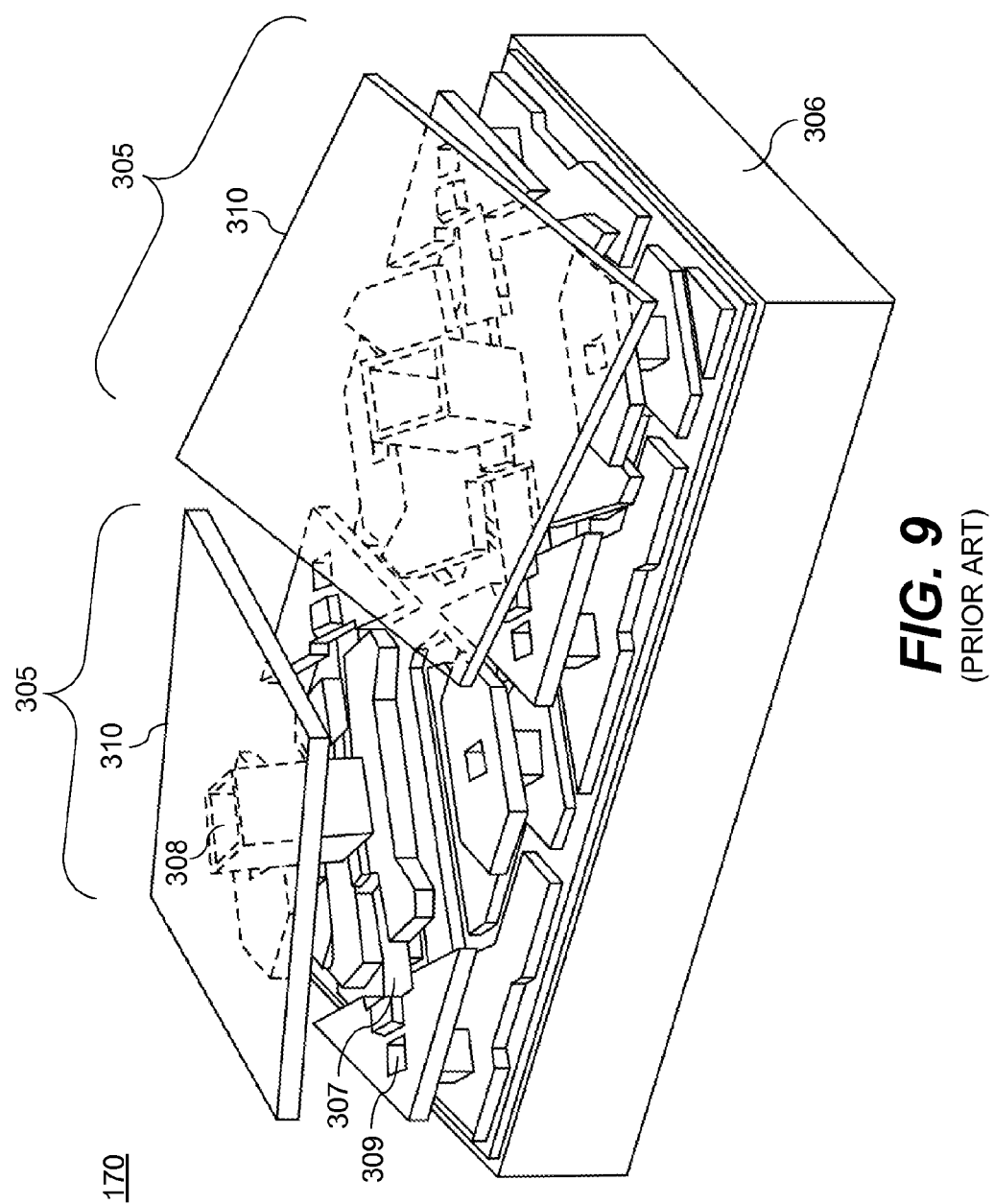
FIG. 9 depicts a portion of the structure of a DMD modulator device.

DMD-type spatial light modulators 170 comprise an array of tiny, square micro-mirror pixels, each comprising a micro-mirror fabricated on a hinge atop a substrate. Typically the substrate includes a CMOS static random access memory (SRAM). For better understanding, FIG. 9 depicts a portion of a DMD-type spatial light modulator 170 including two DMD pixels 305. Each DMD pixel 305 comprises a micro-mirror 310 fabricated on a hinge 307 atop a substrate 306. The micro-mirror 310 is connected to its corresponding hinge 307 through a via 308 in the center of the micro-mirror 310. The hinge 307 is a compliant strap of metal that is connected through vias 309 to the fixed metal at each end. This configuration allows the hinge 307 to rotate and provides some tension to minimize the sag in the vertical direction. The hinges 307 allow the micro-mirrors 310 to complete crossover transitions in which they tilt between two states (or angular positions), such as +10 degrees for an "ON" state (as shown for the right-hand DMD pixel 305) and −10 degrees for an "OFF" state (as shown for the left-hand DMD pixel 305). When the micro-mirrors 310 are not operating, they sit in a "parked" state at 0 degrees. The "ON" state light is directed through the beam combiners 165 and imaging lens 180 to the screen 80, while the "OFF" state light is diverted to a beam dump or light trap. The mechanical switching time for a micro-mirror 310 to switch between "ON" or "OFF" states ranges between 8~15 μs, depending on the generation of the technology.

The DLP devices are temporally modulated with a bit modulation scheme, such that when a given code value is commanded, a combination of bits are presented as a sequence of light pulses within a pixel time. Two different bit modulation schemes are shown in FIGS. 10A and 10B. A code value is expressed as binary code values 320 in a binary integer representation comprised of a series of bits (numbered 0 to 4). For illustration purposes, the binary code values 320 are shown as being 5-bit code values, which can be used to represent 32 different intensity levels (0-31). In actual implementations, the code values will typically be represented using 8-bit to 12-bit encodings.

In FIG. 10A, the frame ON time 345 (or the sub-frame ON time 365) is subdivided into a PWM pattern 321. Each portion of the PWM pattern 321 is controlled by a corresponding bit of the binary code values 320. The least significant bit (LSB) 330 is labeled as bit 0, and the most significant bit (MSB) 335 is labeled as bit 4. The time interval corresponding to each successive bit is nominally twice as long as the time interval for the preceding bit. The most significant bit (MSB) 335 then consumes half the pixel on time as one contiguous pulse of light, which is typically center justified in the frame time or sub-frame time. The DMD micro-mirror 310 (FIG. 9) is held in an "ON" state or "OFF" state in accordance to the binary code value 320 and the PWM pattern 321. The human visual system effectively integrates the pulsed light to form the perception of desired intensity. The perceived intensity is proportional to the percentage of time the mirror is "ON" during the frame ON time 345.

Example DMD activation patterns 325 are illustrated for two different binary code values 320. In the first case (binary code value=01111) the most significant bit is "OFF" and the rest of the bits are "ON". The corresponding DMD activation pattern 325 shows that the DMD is "ON" (as indicated by the shading pattern) during the time intervals in the PWM pattern 322 corresponding to bits 0-3, and is "OFF" during the time interval corresponding to bit 4. This results in the pixel being turned on for ~48% of the frame ON time 345. Similarly, in the second case (binary code value=11010), the DMD activation pattern 325 shows that the DMD is "ON" during the time intervals in the PWM pattern 322 corresponding to bits 1, 3 and 4, and is "OFF" during the time interval corresponding to bits 0 and 2. This results in the pixel being turned on for ~84% of the frame ON time 345.

However, it has been observed that the bit modulation scheme of FIG. 10A can provide perceptible temporal shimmer or flickering, in part because the light pulses are unevenly distributed during a frame time. To reduce image flicker, an alternate bit modulation scheme can be used, such as that represented by bit-splitting PWM pattern 322 depicted in FIG. 10B. (This bit modulation scheme is similar to that described by D. Doherty and G. Hewlett in the article "Phased Reset Timing for Improved Digital Micromirror Device (DMD) Brightness" (SID Symposium Digest of Technical Papers, Vol. 29, pp. 125-128, 1998). Instead longer bits, such as MSB 335 are "fragmented" or split within the frame ON time 345 (or the sub-frame ON time 365), to distribute the presence of on state light more evenly through the frame time, producing DMD activation patterns 326. Thus, in FIG. 10B, the MSB 335 was split into 8 split bits, each labeled "4", which are distributed evenly over the frame time, each of which have the same nominal duration as bit "1".

The examples shown in FIGS. 10A and 10B represent two particular examples of bit modulation schemes, however, it will be obvious to one skilled in the art that a wide variety of bit modulation schemes can be used to modulate the image light in accordance with the present invention.

In a DMD-based projector supporting 10-12 bits of code values, equal bit splitting can produce over 1000 split bits with durations that are on the order of the mirror switching times (8-15 μs), which can result in code value reproduction artifacts. Such fine bit splitting is overkill with respect to the temporal averaging of human perception that occurs within a frame ON time 345. Moreover, with high resolution DMD devices, there are so many pixels that they cannot all be loaded simultaneously. Instead, they can be loaded in blocks. For such devices, an alternate bit splitting scheme (not shown), which is intermediate to the schemes of FIGS. 10A and 10B, can be used. In this alternate scheme, the LSB 330 still has a short duration, but the MSB 335 and other large bits are split into pulse durations that exceed the block loading time of ~250 μs. For example, the LSB 330 can have a pulse duration of ~10 μs, while the other low significant bits may have pulse durations of ~20, 40, 80, or 160 μs, as long as they are less than the 250 μs block loading time. The MSB and other long bits are then split into durations that are near, but exceed the block loading time, as appropriate. For example, the MSB 335 can be split into 48 pulses, each with a nominal duration of 20.8 ms/48 or 434 μs. If the frame is split into six sub-frames 360 (FIG. 8B) to support triple flash projection, then eight bit-split MSB pulses can provided in a given sub-frame ON time 365 when a commanded code value for a frame includes the MSB 335.

Figure 11A:
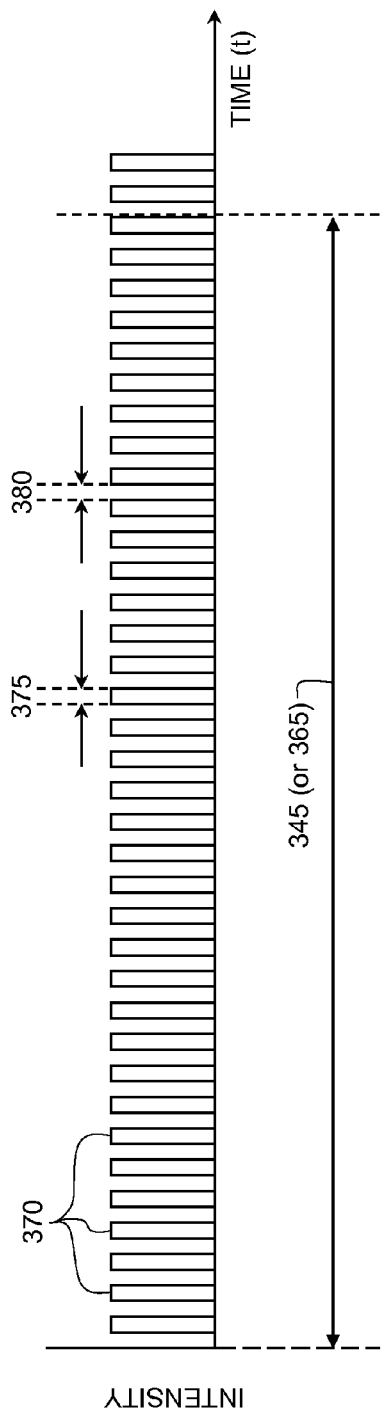
FIGS. 11A and 11B depict laser pulse width modulation timing diagrams.

With this background, the temporal or PWM operation of the laser arrays 120 and the aggregate laser arrays in a color channel (light source assemblies 115), and their interaction with the spatial light modulator PWM, is considered in greater detail. FIG. 11A depicts the operation of a single pulsed laser array 120 (or laser emitter 122), in which a series of laser pulses 370 occur in a periodic time sequence. As noted previously, in some embodiments of projector 100, the green and blue channels can use laser arrays from NECSEL. The operational reliability, stability, and lifetimes of these laser arrays are enhanced when they are driven by PWM rather than CW. In particular, these laser arrays are designed to be driven at 30-50% duty cycles with nominal drive frequencies of 300 or 500 kHz. This corresponds to laser pulse durations 375 and laser pulse blanking times 380 of ~1.0-1.7 μs in duration. While these laser pulses 370 are far too fast for the eye to resolve, they are relatively close in duration to the DLP mirror transition time (8-15 μs), or the pulse duration of the LSB (~10 μs) of the pulse width modulated DMD spatial light modulator 170. Moreover, as the SLM and laser technologies evolve, the time durations may converge further. As a result, if the multiple laser arrays 120 in a light source assembly 115 are synchronized (i.e., in phase) during the display of image code values, quantization artifacts can result due to the interaction between the laser pulses 370 and the DMD activation pattern. Such artifacts are most significant relative to the LSB 330 and other shorts bits (such as bit 1) which will span only a small number of laser pulses 370, particularly for low luminance or near black image content. Under certain conditions, the result can be contouring artifacts within a color channel, or color shading errors resulting from interactions between the color channels. While these effects may seem small, human vision is ~6× more perceptive of low frequency color shading artifacts than it is to low frequency intensity shading artifacts. This can be complicated by the fact that the different color channels often utilize different modulation schemes. In considering the latter point, it is noted that red laser diode arrays can operate CW, while the green and blue lasers have different PWM parameters.

Figure 11B:
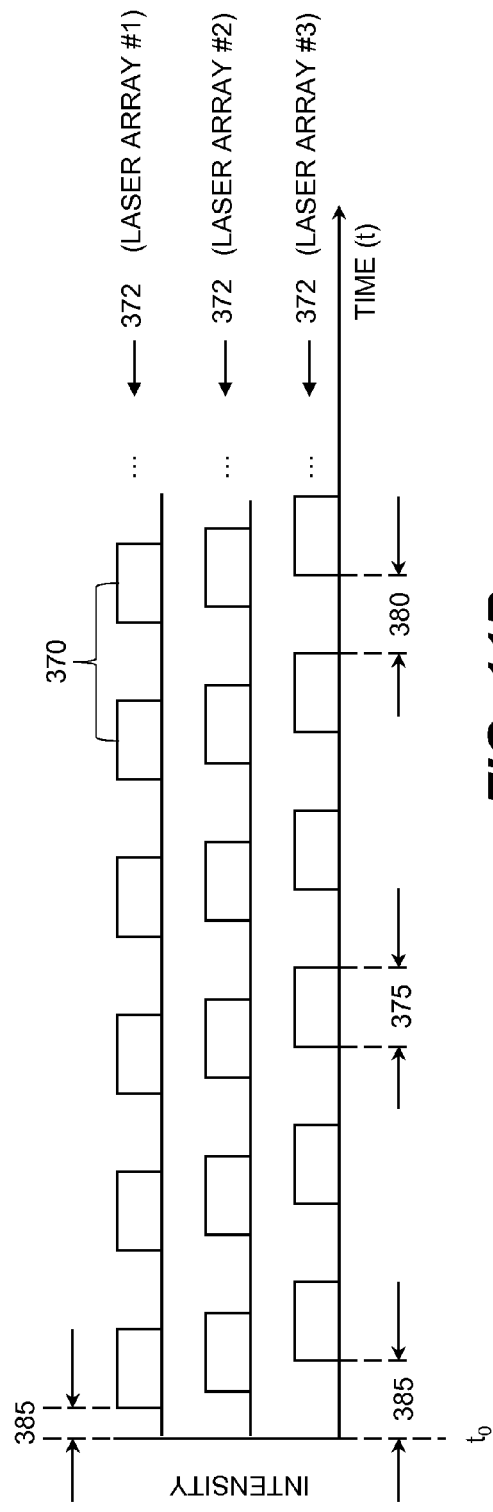

Therefore, the present invention provides for operating the various laser arrays 120 using different pulse modulation parameters such that the light beams from the individual laser arrays 120 aggregate to form a color channel in a mutually asynchronous manner. In this manner, the light intensity fluctuations in the aggregate light beam within the frame can be greatly reduced. One example of asynchronous operation is depicted in FIG. 11B, which shows exemplary portions of the pulse trains 372 provided by 3 different laser arrays 120. (FIG. 11B is similar to FIG. 11A, except that the time scale is expanded so that the laser pulses 370, laser pulse durations 375, and laser pulse blanking times 380, can be seen in greater detail.) Relative to an initial time point $t_0$, the different laser pulse trains 372 can be seen to have different laser pulse timing offsets 385 corresponding to a pulse phase delay parameter associated with the particular laser array 120. The light intensity in the aggregate light beam formed by combining the light beams from the individual laser arrays will be equal to the sum of the laser pulse trains 372 for the set of laser arrays 120. It can be seen (see FIG. 11D) that the laser pulse blanking times 380 in the laser pulse train 372 for a particular laser array will be filled in by the laser pulses in the laser pulse trains 372 from the other laser arrays, such that the light intensity fluctuations in the aggregate light beam will be greatly reduced relative to the case where the laser pulse trains 372 are all in synchronization.

The asynchronous operation of the laser arrays 120 can be provided by various ways, including driving the individual laser arrays 120 with different clock frequencies, or by providing fixed or randomly varying time delays (pulse phase delays) through the laser driver circuitry. The timing relationships among the laser pulse trains 372 for the N laser arrays 120 can be adjusted for a fixed dephasing, or for an adjustable dephasing, that is implemented manually, automatically, or randomly. When their output laser light is overlapped spatially by the illumination optics, and overlapped temporally by asynchronous pulsing, the aggregate illumination light to the spatial light modulator 170 can be both spatially and temporally uniform in light intensity. As the number of lasers (N=12 for example) is large compared to the pulse duty cycle (30-50%), at each instant in time a large number of lasers are contributing to the illumination light.

This asynchronous operation can be accomplished by various methods. For example, the control circuitry 251 within the L1 loop 220 can include an imbedded clock for PWM timing; insuring the each of the lasers can be controlled to have individual PWM signals that will be out of phase with each other. For example, the synchronizing signal to each laser current source can be uniformly offset in time from each of the others by means of a multi-phase clock generator. In this case, the phase of the laser on-times is directly established by this external synchronizing signal. As another option, the synchronizing signal to each laser current source can be randomly offset in time from each of the others by means of a clock generator which produces multiple individual clock signals with random or pseudo-random phase relationships. Temporal averaging can also be assisted if the duty cycles of the laser devices in a color channel are not identical, and further are temporally variable (for example between 28.5-31.5%).

In other embodiments, the laser arrays 120 can be operated at different pulse modulation frequencies. For example, one laser can be operated 500.5 kHz and another at 501.2 kHz, or stepped frequency variations can be applied across the laser devices. Operating frequencies spaced by a few KHz would be unlikely to produce an undesirable effect in laser operation, but would insure that the laser phase relationships are staggered. Of course, two independent oscillators, f1 and f2, will temporarily be in phase with a beat frequency equal to the difference between f1 and f2. A system comprised of 12 independent oscillators, operating at frequencies spaced by a fixed amount would produce phase relationships in a repeating pattern with a cycle time equal to the fixed spacing. While relative time delays amongst the lasers can still be controlled, for example by the L2 loop 215, having fixed oscillator or clock frequencies reduces the available pulse parameters that can be adjusted to compensate for laser device degradation.

Alternately, the synchronizing signals to each laser current source can be randomly offset in frequency from each of the others by means of a clock generator which produces multiple individual stable clock signals with random or pseudo-random frequency distribution. Likewise, the synchronizing signal to each laser current source can be offset in frequency from each of the others by means of a clock generator which produces multiple individual clock signals with assigned frequency distribution. The amplitude and frequency of modulation can be varied by the L2 loop 215 to minimize visual effects, whether the cause is due to the human visual response or interaction with DLPs. In these cases with variable frequencies among the laser devices, whether fixed or programmable, there is the possibility that predictable "beat" frequency effects (PWM signals drift in and out of phase) may occur which can then be overcome by the proper selection of assigned frequencies.

Figure 11C:
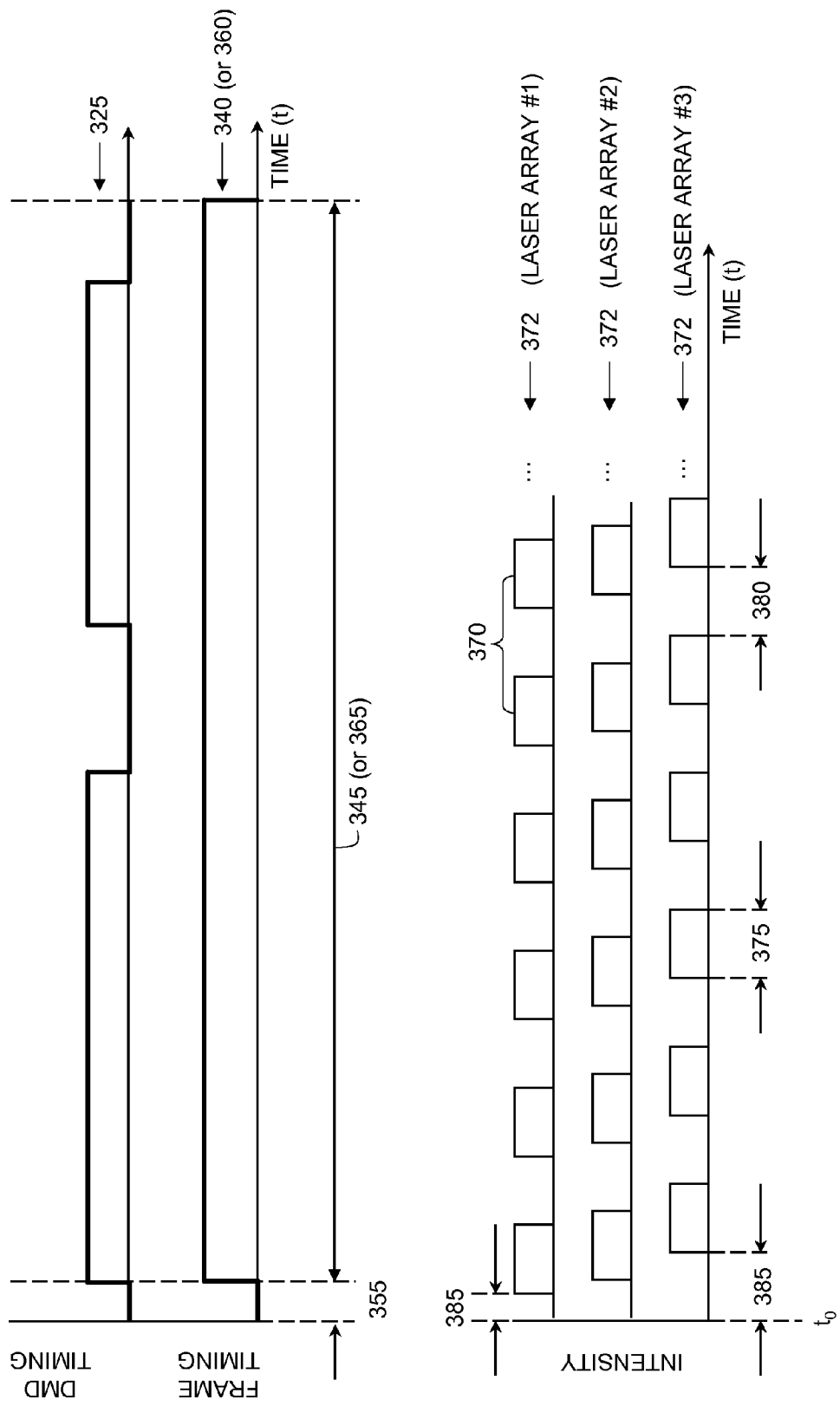
FIG. 11C depicts a timing diagram for laser pulse width modulation in combination with frame and DMD timing.

FIG. 11C is another exemplary timing diagram, depicting a portion of the phased operation of the N lasers in a color channel of FIG. 11B, in combination with aspects of frame timing diagrams (analogous to FIGS. 8A and 8B) and a DMD PWM timing diagrams (analogous to FIGS. 10A and 10B). Projection of the image content for a pixel for a frame 340, or a sub-frame 360, a portion of which is shown, commences at a time $t_0$ corresponding to the start of the frame ON time 345 (or the sub-frame ON time 365). At this time, the DMD activation pattern 325 commands a corresponding DMD micro-mirror pixel to switch to an "ON" state. In this example, the N laser arrays emit trains of laser pulses 370 that are subject to laser pulse timing offsets 385 controlled by pulse phase delay parameters. Although at any given time, some number of the N lasers in a given color channel are off, a nearly constant intensity of laser light in the aggregate light beam can be provided at all times (see FIG. 11D). For example, if N=12 pulse-modulated laser arrays 120 operate with a 50% duty cycle, than in aggregate, ~6 laser arrays are on at all times. By varying the modulation parameters of the laser arrays 120, either in a fixed or active fashion, the invention insures that the blanking times 380 associated with the individual laser arrays 120 do not remove significant light from the DMD activation pattern 325. Furthermore, random or active variation of the laser modulation parameters (time delay or frequency) can prevent a plurality of lasers from locally synchronizing at a given time in each field, frame, or sub-frame, and thus prevents blanking times from locking to a certain DMD bit time that is repeated every field that may otherwise cause a visible artifact. Therefore, the rendition of the image content can be more faithful, regardless of code value.

Figure 11D:
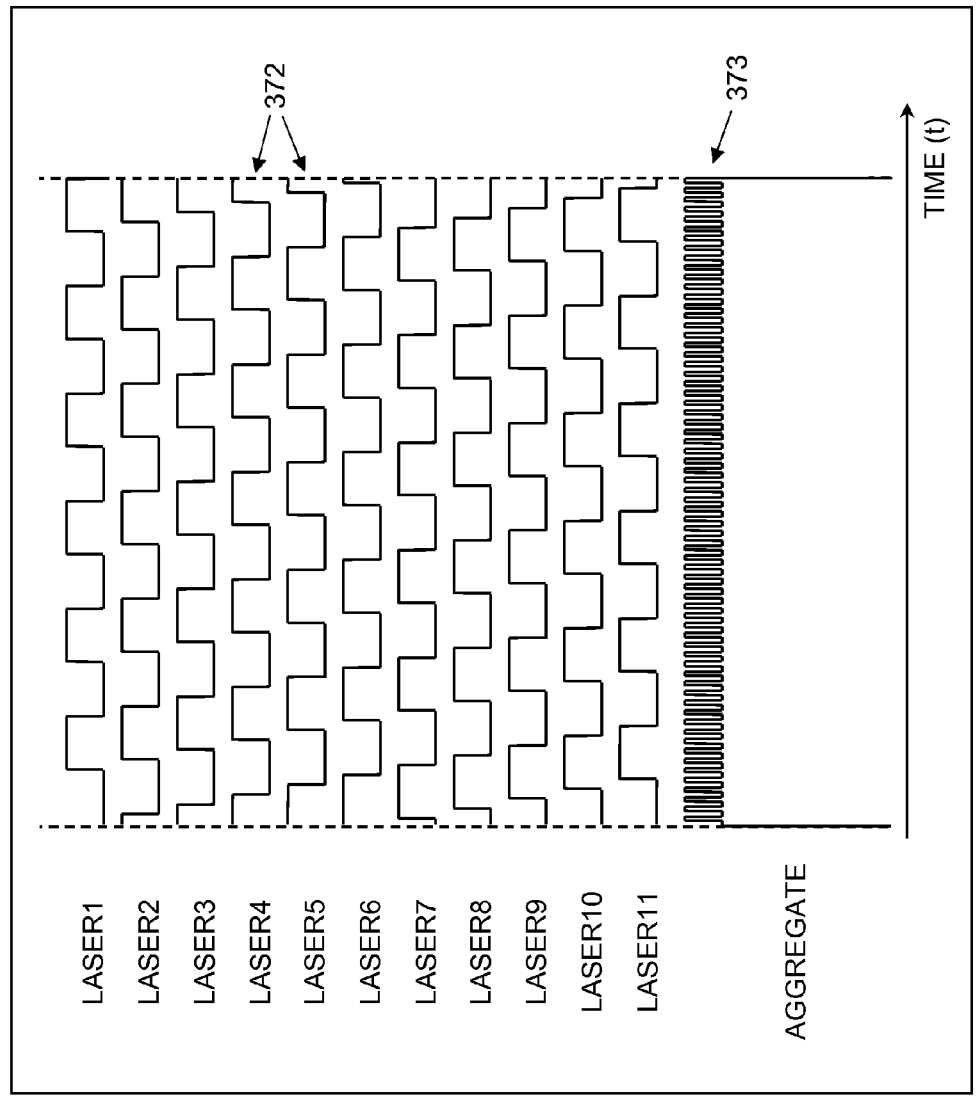
FIG. 11D depicts a timing diagram that illustrates the aggregate light intensity generated from set of laser arrays.

While time delaying the N pulse width modulated lasers to dephase their laser pulse trains 372 can insure that nearly constant light intensity is supplied during the frame ON time 345 (or the sub-frame ON time 365), the resulting temporal intensity profile can still have some degree of ripple. For example, FIG. 11D shows laser pulse trains 372 for a light source assembly 115 having 11 laser arrays 120. Even if each laser array is equal in light intensity and the phases are uniformly spaced, the aggregate light intensity profile 373 can include a residual degree of ripple. The magnitude and frequency of the ripple depends on the number of laser arrays 120 and the variations in laser array performance (e.g., difference in the laser intensity produced by each laser array 120). Note that the peak-to-peak ripple in the aggregate light intensity generally increases as the number of laser arrays N decreases, and that this ripple typically occurs at a frequency which is equal to the number of laser arrays times the modulation frequency.

The laser arrays 120 can be operated during blanking times 355 for each frame, or they can be turned to an OFF state, which can help the perceived screen black levels. In the former case, depending on how the N laser arrays 120 are driven asynchronously, it is possible that image artifacts can occur near the beginning of frames 340 or sub-frames 360. For example, if the N lasers are driven with same clock frequencies, but with random phase (time delays that commence after time $t_0$, the laser devices may start synchronized near time $t_0$, and then become progressively more asynchronous. Depending on the timing and grey scale level, portions of the DMD activation pattern 325 occurring near time to can be impacted, although the effects will be modest. However, it can be preferable to time LSBs 330 and other short bits to occur at times other than at the beginning of frames 340 or sub-frames 360.

As noted previously, red laser arrays 120 are available that can be driven effectively with either CW or pulsed operation. In one embodiment of the present invention, the red lasers devices are driven with PWM, such that the RGB channels can advantageously use at least some common laser driver electronics, and also to minimize potential differential color errors between channels with pulsed laser operation. For example, the red laser modulation rate can be ~1008 Hz (corresponding to a 992 μsec modulation period) with a variable duty cycle option. In this case, there are 42 red laser pulses 370 per frame 340 (or seven laser pulses 370 per sub-frame 360). To equalize the color channels, relative to the L2 loop 215 and the red channel intensity, the red lasers can be modulated using PWM, pulse amplitude modulation (PAM), or both in combination. In comparison to the presently available blue and green laser array devices, the PWM of the red laser arrays allows greater freedom to control the pulse modulation parameters, as for example, the duty cycle is not constrained to be within the range of 30%-50%. For example, for PWM, with a variable modulation duty cycle of 90-95%, the red laser off times (42 per frame) are ~49.6 to 99.2 μs. In general the red laser PWM parameters can be chosen in advantageous ways to enhance laser operation, artifact suppression, or to minimize EMI, or other effects. An upper frequency limit for driving the red lasers can be established based on system limitations, such as circuitry or component limits. As another example, if the individual red laser arrays 120 are driven at frequency greater than the red laser channel modulation rate (1008 Hz in the example above), then the time delays (laser pulse timing offsets 385) can likewise be tuned to ensure that the N laser arrays are operating asynchronously with each other.

It is noted that phased or time staggered modulation of the lasers in a color channel can be supported using the L1 loops 220 or L2 loop 215 relative to monitoring laser behavior for parameters other than just intensity. For example, the L1 loops 220 can individually track that each of the associated laser arrays 120 is operating with the correct frequency, duty cycle, and phase delay. The L2 loops 215 can monitor that the ensemble or aggregated color channel intensities provided during the frames 340 or sub-frames 360, to verify that the asynchronous laser pulses 370 appear in aggregate as a single contiguous pulse of illumination light. This can include monitoring the aggregate pulse against aggregate pulse criteria or acceptability thresholds to determine that are no residual gaps, or gaps exceeding defined criteria (e.g., gap width in µs, or gap reoccurrence frequency). For example, the appearance of reoccurring gaps or intensity drops to half intensity or less, with a temporal duration exceeding one third of an LSB time, can motivate corrective action through the L2 loop 215. The aggregate pulse criteria can also include metrics for aggregate pulse failure relative to the frequency of occurrence, measured for example in occurrences per frame.

Likewise, when the operational quality of a given laser array 120 changes, degrades, or fails, the L2 loops 215 can also provide PWM timing controls to the L1 loops 220. In particular, an L2 loop 215 can alter the pulse modulation parameters (e.g., the amplitude, duty cycle, timing, phase, or frequency parameters) to any or all of the N laser arrays 120 in that color channel, to not only compensate for intensity losses, but also to control the aggregate pulse characteristics to compensate for intensity level timing gaps that correspond to the degraded laser device.

For example, if the intensity of one of the N laser arrays 120 starts to decline, the aggregate light intensity signal sensed by the L2 loop 215 will show a slight reduction in the average light intensity, as well as somewhat increased intensity fluctuations within the frame time 350. The color channel control subsystem 216 can analyze the sensed aggregate light intensity signal to detect the drop in the intensity during the time intervals corresponding to the expected laser pulses for that laser array 120 to infer which laser array has started to degrade. The pulse amplitude for that laser array 120 can be increased (assuming that it is not already at its maximum level) to compensate. If the pulse amplitude for that laser array 120 is already at its maximum value, it may be necessary to increase the pulse amplitudes of the other laser arrays 120 in order to restore the aim intensity level. If the performance of a particular laser array 120 degrades to the point where the light intensity falls below a specified level, it may be appropriate to deactivate that laser array and adjust the pulse modulation parameters for the remaining laser arrays 120 accordingly.

Similarly, if one of the N laser arrays 120 fails, the aggregate light intensity signal sensed by the L2 loop 215 will show a moderate reduction in the average light intensity, as well as significantly increased intensity fluctuations within the frame time 350. The color channel control subsystem 216 can analyze the sensed aggregate light intensity signal to detect the drop in the intensity during the time intervals corresponding to the expected laser pulses for that laser array 120 to infer which laser array has failed. The pulse amplitude values for the remaining laser arrays 120 can be increased (assuming that they are not already at their maximum level) to compensate for the overall reduction in the average light intensity in the aggregate light beam. Additionally, pulse phase delay parameters can be adjusted to uniformly distribute the phases for the remaining laser arrays 120. This will have the effect of reducing the light intensity fluctuations in the aggregate light beam, and therefore reduce any potential interactions between the fluctuations in the light intensity and the PWM of the DMD device. If the output light intensity for a particular color channel is already at its maximum level such that the L2 loop 215 cannot restore the light intensity of the aggregate light beam to its aim value, it may be necessary for the L3 loop 210 to reduce the aim light intensity values for all of the color channels in order to maintain the desired white point.

It is noted that the three color channel control subsystems 216 for the three color channels operate independently of each other. Also each light source control subsystem 225 can generate pulse modulation parameters corresponding to different power level settings, including high power left channel, high power right channel, low power left channel, and low power right channel. For example, left and right power selection can be controlled by a left/right signal 261 (FIG. 6) from the projector main circuitry. The values of the individual power settings are determined during calibration and accessed in non-volatile storage in the microprocessor.

The just described functionality of the present invention can be supported in various ways, including with alterations to the light source control subsystem 225 of FIG. 6. To monitor or control the PWM behavior of a laser array 120, most practical systems will have at least one closed loop at the lowest level. There are several different possible implementations of the enhanced L1 loop 220, including Type 1, having a constant current source laser driver; Type 2, having a virtual constant current source laser driver; Type 3, having a constant voltage source laser driver; Type 4 having a constant light, current source laser driver; and Type 5, having a constant light, voltage source laser driver. These variations are known to those in the art, and differ primarily in the quantity that is measured and thus controlled.

Types 4 and 5 L1 loops 220 provide the most direct control of light intensity and the potential capability to report that light intensity up in the hierarchy. Types 1 and 2 L1 loops 220 provide the best opportunity for use in practical systems because the laser arrays are essentially current devices, and the control of the current through the laser will be independent of any optical measurement difficulties or laser efficiency considerations. Laser voltage must be monitored frequently to insure operation is within safe ranges. Types 1, 2 and 3 L1 loops 220 do not include measurement of the actual light output of the laser so some auxiliary method must be implemented. In implementing the Type 3, 4, or 5 L1 loops 220, real-time monitoring of the laser current and voltage is still required to prevent excessive power dissipation in the laser and circuits.

Any of these loops can be physically implemented using a digital control system, an analog servo system, or a combination of the two. Any of the signals in any of the loops, except for the actual current through or voltage across the laser may exist as physical electrical signals such as voltage, current or pulse train or may be represented as numbers in a computer program.

In some embodiments, the L1 loops 220 of FIG. 6 can include a remote controlled switch (not shown), which is provided to permit laser blanking capability and to enable the PWM mode of operation required for optimal utilization some of laser array types. The remote controlled switch represents the command and communication mechanism of a higher-order power control system, such as an L2 loop 215. The remote controlled switch can also be used to provide PWM power control although this method of power control is not preferred. As discussed previously, PWM switching frequencies and duty cycles can be determined by laser characteristics rather than system concerns. However, the relative phase delays (time delays) of these PWM operations are preferably controlled by a higher level system (e.g., the L2 loop 215) to provide staggered reference clock signals or a single fixed clock signal for PWM generators capable of adjustable phase. This control of phase need not be exactly part of either the L1 loops 220 or the L2 loops 215, as the result can be viewed as an external influence on the loops that causes light output changes for which the loops must correct.

The details of phase assignment to the individual lasers can be affected by L1 loops 220 or the L2 loops 215 as adjustments made to compensate for loss of laser output.

A control system such as L2 loop 215 can arrange the phase relationships of the laser arrays 120 via the remote control switches within a color channel to insure continuous application of light. The L1 loops 220 can supply data concerning failed or weakened lasers, while the L2 loop can provide data concerning aggregate laser behavior as measured against the aggregate pulse criteria. It is noted that unpredictable (and therefore largely uncontrollable) image artifacts can result if the output of the switching regulator is not filtered sufficiently to prevent the laser diode current from modulation by this switching activity. Additionally, the phases of the various switching regulators can be controlled and adjusted to minimize system current transients, but this is more to insure electromagnetic emissions (EMI) compliance than to manage image artifacts and is not directly involved in L1 loops 220 or the L2 loops 215.

In summary, the present invention provides a method for driving a laser-based projector in which at least one of the color channels comprises a plurality of PWM laser devices, where the overall color balance or white point targets of the projector must be controlled relative to target criteria with respect to the changing PWM behavior of the lasers in the given color channel, as measured using aggregate PWM criteria. These aggregate criteria are also used to reduce residual ripple, and guarantee that the aggregate laser light output in a color channel is never zero during the imaging time intervals when image modulation bits can be exercised. In the case of the exemplary projector of FIGS. 1 and 7, which in a preferred embodiment use NECSEL lasers, the blue lasers are nominally driven at 500 KHz and 30% duty cycle, while the green lasers operate at 300 KHz and 50% duty cycle. While the frequencies can be reasonably closely controlled, as each NECSEL laser driver can operate with its own local crystal-based oscillator or clock, the phase relationships between the laser drivers can appear quite stable for extended periods of time, but still drift with time. With a sufficient number of independent lasers in a color channel, such as 8 or 12, the phase relationships can be sufficiently random to keep visually discernible intensity variation at a minimal level.

As an example, for the green channel with N lasers operating at 300 KHz and 50% duty cycle, if any 2 lasers are driven to be precisely synchronized at 180° out of phase, then a continuous, ripple-free output equivalent to the power of one laser will be provided. More generally, with 50% duty cycle modulation and precise, even phase distribution, an even number of lasers will produce a continuous, ripple-free output. However, an odd number of lasers with an even fixed phase relationship, such as N=11 lasers with equal intensity output, will produce an output with a ripple frequency at 11× the modulation frequency and with an amplitude of 1 laser power peak to peak on 10 laser powers, as shown in FIG. 11D. If the N lasers vary in output intensity, the ripple will be more complicated. If the phase relationships are made variable or random amongst the individual lasers, or in a pair-wise fashion, the ripple structure ceases to have the regularity in frequency or amplitude depicted in FIG. 11D, which can reduce residual artifacts from interactions with the PWM of the spatial light modulator 170 (the DMD). As another example, pertinent to the blue channel, it is noted that with equal power laser devices operating at a 30% duty cycle, ripple free performance cannot be achieved as 360°/(0.3×360° is not an integer.

The aggregate pulse criteria applied by the L2 loop or an equivalent level control system can for example factor in the output intensities of weak and strong laser devices, with the goal of reducing ripple. For example, a pair of laser devices with 50% duty cycles, both particularly strong in output intensity, could be asynchronously driven 180° out of phase, so that their on and off states cancel, to reduce aggregate intensity ripple. The remaining N-2 lasers can be driven with completely random phase relationships, or with pair wise phased relationships that are random relative to other pairs, or combinations thereof. Once initial phase relationships are established and communicated through the remote controlled switches, these relationships can be maintained until the behavior of one or more lasers in one or more color channels then requires a response. For example, an L1 loop 220 can report that a laser device has failed or experienced a significant (30% for example) power loss. Alternately, an L2 loop 215 can report that the aggregate output intensity of a color channel has decreased, causing white point or color balance errors. The L3 loop 210, or an operator, can then determine new relative color channel outputs to restore white point or color balance. Subsequently, the L2 loop 215 can determine new pulse modulation parameters, including pulse phase delay parameters or pulse amplitude parameters, and communicate them to the one or more laser arrays 120 accordingly.

Within a color channel, the inventive method controls the pulse modulation parameters (e.g., pulse duty cycle (%), pulse phase delay (seconds or degrees), pulse frequency (Hz), and pulse amplitude (volts or mW) with deliberate or randomized controls, to prevent pulse synchronization and reduce residual ripple as guided by the sensed aggregate light intensity. The inventive method also controls the laser pulse modulation parameters between the color channels, to yield behaviors across the color channels that maintain color balance and white point targets and reduce color shading artifacts, as the behavior of individual laser devices changes in a substantive manner.

It is also recognized that the display white point is not only a function of the color channel intensity levels, but is also a function of the color channel wavelengths. In the case of a laser projection display, as the performance of one or more of the N laser arrays 120 in a color channel changes over time, the ensemble spectra can also change. Conceivably, both the color gamut and white point can be affected, and the L2 loop 220 can change the pulse modulation parameters for one or more light sources or color channels to compensate. However, as the laser devices typically have narrow spectra (0.5-1.0 nm bandwidth) and fall in a narrow spectral range (2-7 nm), these effects will typically be insignificant when averaged over N laser arrays.

As noted previously, the projector 100 can use L1 loops 220 to provide feedback control of individual laser devices 120, enabling them to maintain desired characteristics as specified by the L2 loop 215. This approach requires that a sensing means such as photodiode 240, be used to monitor the output of each laser array 120, so that device performance can be controlled in real time.

In an alternate embodiment, the photodiodes 240 for the individual laser arrays 120 can be eliminated and the laser arrays 120 and the relevant pulse modulation parameters can be determined in response to a single photodiode 240 associated with the L2 loop 215 for a particular color channel 245. In one configuration, the photodiode 240 associated with the L2 loop 215 can be effectively used as a sensor for the L1 loops 220 by sequentially activating one laser array 120 at a time during a calibration process such that the photodiode 240 senses the light from only that single laser array 120. The calibration process can be run at a time when the projector 100 is not being used (e.g., when the theater is closed or during times between showings of feature films). In this case, the status or performance determinations for the laser devices 120 will not occur in real time. Alternately, for more continuous monitoring and control, the calibration process can be performed during the blanking times 355 when the spatial light modulator 170 is not directing image light to the screen 80 in order to provide for more continuous monitoring.

As a variation of this approach, in some embodiments the L1 loops 220 can be eliminated altogether and the pulse modulation parameters for the laser devices 120 can be determined directly from the aggregate light intensity signal sensed by the photodiode 240 associated with the L2 loop 215. In this case, the color channel control subsystem 216 can apply knowledge of the expected aggregate light intensity signal to detect suspect laser behavior for a particular laser array. These aggregate light intensity signal can be measured either during the blanking times 355 or during the frame ON times 345 (or sub-frame ON times 365).

The analysis of the aggregate light intensity signal to determine the pulse modulation parameters for the individual laser arrays 120 can be performed by various approaches. The L2 loops 215 and color channel control systems 216 can use various algorithms or programs accessible from a memory (flash drive or alternatives), and processable through a computer or CPU, to analyze the aggregate light pulse modulation characteristics to determine either individual light source or aggregate light source pulse behavior, and then to determine corrective actions as necessary relative to the target aggregate pulse criteria. For example, a difference between the aggregate light intensity signal and the expected aggregate light intensity signal can be computed. Periodic patterns in the difference signal can then be identified and associated with a particular laser array 120. In some embodiments, Fourier transforms, or other spectrally discriminative calculative methods, can be used to analyze the difference signal to identify and quantify any changes in aggregate ripple behavior. Corrective actions can then be taken as necessary to correct for any deficiencies that are detected. For example, if a drop in the intensity of a particular laser array 120 is detected, the pulse amplitude for that laser array 120 can be increased to compensate. Alternately, if it is detected that a particular laser array 120 has failed, then pulse phase delay parameters for the remaining laser arrays 120 can be adjusted to provide appropriate phase offsets between the laser arrays 120 in order uniformly distribute the pulses thereby reducing irregularities in the aggregate intensity ripple. Various systems for providing the appropriate phase offsets between the lasers to insure the desired uniform coverage are known in the art. Such methods include basic synchronous phase generation, consolidated synchronous phase generation, distributed synchronous phase generation, and pseudo-random phase generation. Combination phase generation approaches can be used as well, such as having the pair-wise synchronized phasing of a weak light source with a strong light source in a color channel 245, while applying pseudo-random phase generation to the other light sources in the color channel.

In another embodiment, the L2 loop 215 lacks a dedicated photodiode 240 for directly sensing aggregate light intensity signals. Rather, the signals from photodiodes 240 for the L1 loops 220 are combined to form a synthesized aggregate light intensity signal for the L2 loop. In this case, the color channel control subsystem 216 can algorithmically assess the synthesized aggregate light intensity signal to determine if the pulse modulation parameters for any particular pulse modulated light source need to be changed to improve the aggregate behavior from the plurality of pulse-modulated light sources.

It should be understood that the method for multi-laser, multi-channel PWM method of the present invention can be used for applications, or in systems, other than just for a three color channel, front projection, laser-based digital cinema projection system. For example, the method can be extended to a laser projection system having more than three channels, such as a system with a fourth channel (e.g., yellow) for an expanded color gamut.

The inventive method can also be used in a rear projection system, such as for RPTV. The method is also extendable to usage with other light sources, such as fiber lasers, LEDs or super-luminescent diodes (SLEDs), which are expanding in capability (including higher power and narrower spectra), and which can be used in electronic display devices. As another variant, the display surface or screen 80 can be a target plane where a print media is positioned, and the present invention then enables an optical printer driven with a plurality of pulse width modulated light sources.

The inventive method can also be applied more generally to illumination systems which use a multiplicity of pulse modulated light sources to provide an aggregate illumination beam directed onto an illumination plane. In some embodiments the illumination system is a multi-spectral illumination system, in which different spectral sources comprising pulse-modulated laser or LED arrays, including ultraviolet (UV) or infrared (IR) radiation, need to be kept in a comparative balance, even though that balance is not defined as a maintenance of color balance or white point.

The figures shown and described herein are provided to illustrate principles of operation according to the present invention and are not drawn with intent to show actual size or scale. Because of the relative dimensions of the component parts for the laser devices and optical system of the present invention, some exaggeration is necessary in order to emphasize basic structure, shape, and principles of operation.

The invention has been described in detail with particular reference to certain preferred embodiments thereof, but it will be understood that variations and modifications can be effected within the spirit and scope of the invention.

PARTS LIST 50 optical path
80 screen
100 projector
105 light modulation control subsystem
110, 110r, 110g, 100b illumination assembly
115, 115r, 115g, 115b light source assembly
120, 120' laser array
122 laser emitter
125 laser combining assembly
127 faceted prism
128 dual-sided faceted prism
129 light-redirecting facets
130 redirection surface
131 output surface
132 light input facets
133 incident surface
135 illumination beam combiner
137 half wave plate
140 light beam
142 leakage light
150 illumination lens
155 light integrator
160 mirror
165 beam combiner
166 first dichroic element 167 second dichroic element
170 spatial light modulator
175 image light
180 imaging lens
185 projection lens
190 relay lens
195 intermediate image
200 despeckler
205 shutter
210 L3 loop
211 white point control subsystem
215 L2 loop
216 color channel control subsystem
220 L1 loop
225 light source control subsystem
226 light intensity signal
230 laser driver
240 photodiode
245 color channel
251 control circuitry
253 amplifier
254 summation device
257 aim voltage
258 control signal
259 voltage signal
260 error signal
261 left/right signal
262 bus
305 DMD pixel
306 substrate
307 hinge
308, 309 via
310 micro-mirror
320 binary code value
321, 322 PWM pattern
325, 326 DMD activation pattern
330 least significant bit (LSB)
335 most significant bit (MSB)
340 frame
345 frame ON time
350 frame time
355 blanking time
360 sub-frames
365 sub-frame ON time
370 laser pulse
372 laser pulse train
373 aggregate light intensity profile
375 laser pulse duration
380 laser pulse blanking time
385 laser pulse timing offset

The invention claimed is:

1. A color projection display, comprising:
a plurality of color channels, in which at least one color channel includes:
a light source assembly including a multiplicity of pulse modulated light sources providing an aggregate light beam;
a light modulation control subsystem to control pulse modulation parameters for the multiplicity of pulse-modulated light sources;
illumination optics to direct the aggregate light beam to an image modulation plane; and
a spatial light modulator in the image modulation plane having an array of addressable pixel elements, each of which is pulse width modulated during an imaging time interval to impart image data to the transiting aggregate light beam to provide image light;
an optical combiner to redirect image light from the plurality of color channels onto a common optical path; and
projection optics to receive the combined image light traversing the common optical path and to project the combined image light onto a display surface;
wherein the light modulation control subsystem senses an aggregate light intensity signal for the aggregate light beam and controls the pulse modulation parameters for the multiplicity of pulse-modulated light sources responsive to the sensed aggregate light intensity signal to reduce light intensity fluctuations in the aggregate light beam within the imaging time interval, and wherein the pulse modulation parameters include pulse phase delay parameters for the multiplicity of pulse-modulated light sources that are controlled such that pulse trains from the multiplicity of pulse-modulated light sources overlap in an asynchronous fashion, and are controlled to randomly distribute the phases.

2. The color projection display of claim 1 wherein the pulse modulation parameters further include a pulse duty cycle parameter, or a pulse frequency parameter.

3. The color projection display of claim 1 wherein the light modulation control subsystem further controls the pulse modulation parameters such that an average aggregate light intensity for the aggregate light beam is substantially equal to an aim aggregate light intensity level.

4. The color projection display of claim 1 wherein the sensed aggregate light intensity signal is analyzed to determine when the performance of one or more of the pulse-modulated light sources has degraded or is unstable, and in response pulse phase delay parameters for at least the other pulse-modulated light sources are modified to reduce light intensity fluctuations in the aggregate light beam introduced by the performance degradation or instability of the one or more pulse-modulated light sources.

5. The color projection display of claim 1 wherein the sensed aggregate light intensity signal is analyzed to estimate differences in light intensities between the multiplicity of pulse-modulated light sources, and in response pulse modulation parameters for one or more of the pulse-modulated light sources are modified.

6. The color projection display of claim 1 wherein the light modulation control subsystem controls the pulse modulation parameters for the multiplicity of pulse-modulated light sources in one color channel responsive to sensed aggregate light intensity signals for a plurality of color channels.

7. The color projection display of claim 1 wherein the light modulation control subsystem controls the pulse modulation parameters for the multiplicity of pulse-modulated light sources in one color channel responsive to a white point sensed in the combined image light.

8. The color projection display of claim 1 wherein the spatial light modulator is a digital micro-mirror array device having an array of micro-mirrors, each associated with an image pixel, and wherein the orientation of the micro-mirrors is adjusted in a pulse width fashion during an imaging time interval to impart the image data to the transiting aggregate light beam.

9. The color projection display of claim 1 wherein the spatial light modulator is a liquid crystal device, a grating light valve device, or a grating electro-mechanical system device.

10. The color projection display of claim 1 wherein the pulse-modulated light sources include pulse-modulated laser devices, pulse-modulated laser array devices, pulse-modulated LED devices, or combinations thereof.

11. The color projection display of claim 1 wherein the imaging time interval is a frame time or a sub-frame time.

12. The color projection display of claim 1 wherein a plurality of color channels include light modulation control subsystems.

13. The color projection display of claim 1 wherein the light modulation control subsystem further senses individual light intensity signals for each of the multiplicity of pulse-modulated light sources, and wherein the process of determining the pulse modulation parameters for the multiplicity of pulse-modulated light sources is also responsive to the individual light intensity signals.

14. The color projection display of claim 3 wherein the aim aggregate light intensity levels for each color channel are specified to achieve a desired system white point.

15. The color projection display of claim 6 wherein the pulse modulation parameters are controlled to produce desired system white point.

16. The color projection display of claim 8 wherein the pulse modulation parameters for the multiplicity of pulse-modulated light sources are controlled to reduce light intensity fluctuations in the aggregate light beam within a time interval corresponding to a pulse width of a micro-mirror pulse associated with a least-significant bit of the image data.

17. A color projection display, comprising:
a plurality of color channels, in which at least one color channel includes:
a light source assembly including a multiplicity of pulse modulated light sources providing an aggregate light beam;
a light modulation control subsystem to control pulse modulation parameters for the multiplicity of pulse-modulated light sources;
illumination optics to direct the aggregate light beam to an image modulation plane; and
a spatial light modulator in the image modulation plane having an array of addressable pixel elements, each of which is pulse width modulated during an imaging time interval to impart image data to the transiting aggregate light beam to provide image light;
an optical combiner to redirect image light from the plurality of color channels onto a common optical path; and
projection optics to receive the combined image light traversing the common optical path and to project the combined image light onto a display surface;
wherein the light modulation control subsystem senses a light intensity signal for at least one particular pulse modulated light source and controls the pulse modulation parameters for a plurality of pulse-modulated light sources responsive to the sensed light intensity signal to reduce light intensity fluctuations in the aggregate light beam within the imaging time interval, and wherein the pulse modulation parameters include pulse phase delay parameters for the multiplicity of pulse-modulated light sources that are controlled such that pulse trains from the multiplicity of pulse-modulated light sources overlap in an asynchronous fashion.

18. The color projection display of claim 17 wherein the sensed aggregate light intensity signal is analyzed to determine when the performance of at least one of the the particular pulse-modulated light sources has degraded or is unstable, and in response pulse phase delay parameters for at least the other pulse-modulated light sources are modified to reduce light intensity fluctuations in the aggregate light beam introduced by the performance degradation or instability.

19. A method for providing illumination light in a color channel of an color projection system, the color channel including a light source assembly having a multiplicity of pulse modulated light sources, comprising:
operating the multiplicity of pulse-modulated light sources to provide a multiplicity of pulse-modulated light beams;
combining the multiplicity of pulse-modulated light beams to provide an aggregate light beam;
sensing a light intensity signal for the aggregate light beam;
determining pulse modulation parameters for the multiplicity of pulse-modulated light sources responsive to the sensed light intensity signal to reduce light intensity fluctuations in the aggregate light beam, wherein the pulse modulation parameters include pulse phase delay parameters for the multiplicity of pulse-modulated light sources that are controlled such that pulse trains from the multiplicity of pulse-modulated light sources overlap in an asynchronous fashion; and
directing the aggregate light beam using illumination optics to provide illumination light onto a spatial light modulator.

20. An illumination system, comprising:
a light source assembly including a multiplicity of pulse modulated light sources providing an aggregate light beam;
a light modulation control subsystem to control pulse modulation parameters for the multiplicity of pulse-modulated light sources; and
illumination optics to direct the aggregate light beam to an illumination plane;
wherein the light modulation control subsystem senses an aggregate light intensity signal for the aggregate light beam and controls the pulse modulation parameters for the multiplicity of pulse-modulated light sources responsive to the sensed aggregate light intensity signal to reduce light intensity fluctuations in the aggregate light beam, wherein the pulse modulation parameters include pulse phase delay parameters for the multiplicity of pulse-modulated light sources that are controlled such that pulse trains from the multiplicity of pulse-modulated light sources overlap in an asynchronous fashion.

21. The illumination system of claim 20 wherein the pulse modulation parameters further include a pulse duty cycle parameter, or a pulse frequency parameter.

22. The illumination system of claim 20 wherein the sensed aggregate light intensity signal is analyzed to determine when the performance of one or more of the pulse-modulated light sources has degraded or is unstable, and in response pulse phase delay parameters for at least the other pulse-modulated light sources are modified to reduce light intensity fluctuations in the aggregate light beam introduced by the performance degradation or instability of the one or more pulse-modulated light sources 23. The illumination system of claim 20 wherein the sensed aggregate light intensity signal is analyzed to estimate differences in light intensities between the multiplicity of pulse-modulated light sources, and in response pulse modulation parameters for one or more of the pulse-modulated light sources are modified.

24. The illumination system of claim 20 wherein the light modulation control subsystem further senses individual light intensity signals for each of the multiplicity of pulse-modulated light sources, and wherein the process of determining the pulse modulation parameters for the multiplicity of pulse-modulated light sources is also responsive to the individual light intensity signals.

25. The illumination system of claim 20 wherein the pulse modulation parameters for the multiplicity of pulse-modulated light sources are controlled such that the asynchronous pulse trains are randomly distributed or are substantially uniformly distributed.

\* \* \* \* \*